United States Patent
Farías et al.

(10) Patent No.: US 9,584,874 B1
(45) Date of Patent: Feb. 28, 2017

(54) PORTAL FOR COLLECTION AND DISTRIBUTION OF WEB-BASED AUDIOVISUAL CONTENT BLOCKS AND CREATION OF AUDIENCE STATISTICS

(71) Applicants: Juan José Farías, Ciudad Autónoma de Buenos Aires (AR); Martín Eduardo Dellamula, San Martin (AR); Sergio Oscar Martinez, Merlo (AR)

(72) Inventors: Juan José Farías, Ciudad Autónoma de Buenos Aires (AR); Martín Eduardo Dellamula, San Martin (AR); Sergio Oscar Martinez, Merlo (AR)

( * ) Notice: Subject to any disclaimer, the term of this patent is extended or adjusted under 35 U.S.C. 154(b) by 0 days.

(21) Appl. No.: 14/738,801

(22) Filed: Jun. 12, 2015

Related U.S. Application Data

(60) Provisional application No. 62/012,419, filed on Jun. 16, 2014.

(51) Int. Cl.
  *H04N 7/10* (2006.01)
  *H04N 21/81* (2011.01)
  *H04N 21/442* (2011.01)
  *H04N 21/234* (2011.01)

(52) U.S. Cl.
  CPC ..... *H04N 21/812* (2013.01); *H04N 21/23424* (2013.01); *H04N 21/44213* (2013.01)

(58) Field of Classification Search
  CPC ....... H04N 21/23424; H04N 21/44213; H04N 21/4532; H04N 21/482; H04N 5/9201; H04N 21/235; H04N 21/4325; H04N 21/4542; H04N 21/84

USPC .......................................................... 725/34
See application file for complete search history.

(56) References Cited

U.S. PATENT DOCUMENTS

| | | | | |
|---|---|---|---|---|
| 2007/0199017 A1* | 8/2007 | Cozen | ..................... | G06Q 30/02 725/35 |
| 2008/0086754 A1* | 4/2008 | Chen | ................. | H04L 29/06027 725/105 |
| 2008/0098420 A1* | 4/2008 | Khivesara | .............. | G06Q 30/02 725/32 |
| 2008/0127250 A1* | 5/2008 | DaCosta | ............ | H04N 21/2668 725/34 |
| 2012/0124604 A1* | 5/2012 | Small | ................. | H04N 21/4223 725/12 |

* cited by examiner

*Primary Examiner* — Nathan Flynn
*Assistant Examiner* — Cynthia Fogg
(74) *Attorney, Agent, or Firm* — Allen D. Hertz, P.A.; Allen D. Hertz

(57) ABSTRACT

An advertisement supported entertainment collection, distribution, and library system accessible over a network. The system retains and manages contents, advertisements, user demographics, content viewing, etc. on a central server enabling collection of viewing metrics and audience member demographics. Contents are segmented and characterized by multiple indices. Production contents are generated by combining a series of production segments with advertising segments inserted between segments. Advertising segment placement criteria is compared to content indices and user demographics to determine placement of advertising segments. Metrics, including advertisement placements, content indices, viewing data, library placement, and user demographics are analyzed to optimize advertisement placements.

20 Claims, 22 Drawing Sheets

PORTAL FOR COLLECTION AND DISTRIBUTION OF WEB-BASED AUDIOVISUAL CONTENT BLOCKS AND CREATION OF AUDIENCE STATISTICS

CROSS REFERENCE TO RELATED APPLICATION

This is a Non-Provisional Patent Application, claiming the benefit of U.S. Provisional Patent Application Ser. No. 62/012,419, filed on Jun. 16, 2014, which is incorporated herein by reference in its entirety.

FIELD OF THE INVENTION

The present invention relates to an entertainment distribution system supported by advertising. More specifically, the system employs an Internet based Portal for creating an audience user library, wherein the system is supported by optimized placements of advertisement segments during viewing of production blocks selected from the audience user library.

PURPOSES OF THE PRESENT INVENTION

The present invention has two purposes:
a. A first purpose of the present invention is to favor users of Internet audio-visual contents, as the Portal extends the possibility of selecting a number, variety, schedules, places and devices with a fully free-of-charge service. Freedom, portability and availability are concepts inherent to the offered service and that make a selection of content more democratic.
b. The audiences of content obtained in this context under the disclosed methodology supplement the traditional audiences and the results accumulated from both audiences provides a process for deriving better conclusions as to the behavior of individuals towards audio-visual content. This information is recorded and analyzed and subsequently used to enhance decisions made by broadcasters and advertisers. Such results contribute to the sociological study of individuals and significantly improve the quality of new contents to be broadcasted in the future.

BACKGROUND OF THE INVENTION

Entertainment distribution methods have been evolving over time. Recorded entertainment is generally parsed into two categories: (1) video productions and (2) audio productions. Video productions are commonly referred to as television productions, as that is the primary employed video distribution or viewing device. Audio productions are commonly referred to as radio productions, as that is the primary employed sound distribution device.

Productions are supported by user subscriptions and/or advertisements. User subscriptions support distribution of productions through cable, satellite, and Internet based distributions. Advertisements support more traditional broadcasting distribution, such as over-the-air television and radio.

Advertisers commonly place advertisements into productions that are associated with certain demographics. Although the demographics are helpful in increasing the effectiveness of the placement of each advertisement, the process is limited, as the current process is based upon statistics based upon limited surveys.

Broadcast distribution of video and audio includes inherent limitations. Broadcast productions are transmitted at predetermined times and are received by any of a variety of audience members. The audience member may or may not be within a demographic targeted by the advertiser. Consequently, the proposed system limits the advertiser's ability to fully optimize an advertising campaign to a specific target audience.

The advent of video cassette recorders (VCRs), and more recently, digital video recorders (DVRs) have added to a reduction of effectiveness of advertisements. Digital video recorders (DVRs) enable an audience member to view a production while fast forwarding or skipping advertisements or commercials.

The current state of the industry limits the effectiveness of an advertising campaign.

Accordingly, there remains a need in the art for a more efficient production distribution method, which enables an improved optimization for placement advertisements directed towards each specific target viewing audience member.

BRIEF SUMMARY OF THE INVENTION

The present invention overcomes the deficiencies of the known art by disclosing a portal for presenting audio and/or audiovisual media in segments, in their entireties, as a collection, a mix, and the like in conjunction with advertising segments. The media segments are selected by the user based upon user defined selection criteria. The advertisement segments are inserted between media segments based upon criteria established by the marketing agency. Media and advertising viewing data is collected and distributed to the marketing agency. The data is analyzed to optimize advertising placement criteria and algorithms.

In accordance with one embodiment of the present invention, the invention consists of an Internet based portal for distributing media segments supported by advertisements, wherein the process provides enhanced metric collection for advertisement optimization, the method comprising:
  establishing viewer demographics of a viewer;
  recording the viewer demographics;
  capturing broadcast production content;
  segmenting the captured production content into production blocks, each production block being a suitable length;
  storing the production blocks in a production block library;
  determining identifiable aspects of each production block in accordance with search criteria;
  indexing the identifiable aspects of each production block enabling searching capabilities and identification of desired production blocks;
  establishing viewer demographics of a viewer;
  recording the viewer demographics;
  capturing broadcast production content;
  segmenting the captured production content into production blocks, each production block being a suitable length;
  storing the production blocks in a production block library;
  determining identifiable aspects of each production block in accordance with search criteria;
  indexing the identifiable aspects of each production block enabling searching capabilities and identification of desired production blocks into a block header index;

obtaining advertisement blocks;
storing the advertisement blocks in an advertisement block library;
establishing an advertising placement index associating the advertisement blocks with advertisement placement criteria;
submitting search criteria for searching the production block library;
searching the production block library for production blocks to identify production blocks matching the submitted search criteria;
selecting production blocks from production blocks matching the submitted search criteria;
combining the selected production blocks into at least one production segment;
editing at least one advertisement block into a stream containing the at least one production segment;
viewing the streamed content containing the at least one production segment and the at least one advertisement block;
recording metrics associated with the viewer demographics, search criteria, the selected production blocks, the viewing history; and
analyzing the metrics to optimize the advertisement placement criteria.

In a second aspect of the present invention, the method further comprising a step of:
selecting the at least one advertisement block based upon the advertisement placement criteria;

In another aspect of the present invention, the method further comprising a step of:
establishing the search criteria using at least one of:
composition title of the captured production content,
genre of the captured production content,
classification of the captured production content,
description of the captured production content,
subject matter of the captured production content,
cast members of the captured production content,
production credits of the captured production content,
release dates of the captured production content, and
chronology of the captured production content.

In yet another aspect of the present invention, the method further comprising a step of:
establishing information associated with the block header index to include at least one of:
start time block of each of the desired production blocks,
duration time span of each of the desired production blocks,
cast members acting in each of the desired production blocks,
characters presented in each of the desired production blocks,
entities shown in each of the desired production blocks,
institutions shown in each of the desired production blocks,
summary of topics associated with each of the desired production blocks,
highlights associated with each of the desired production blocks, and
interests associated with each of the desired production blocks.

In yet another aspect of the present invention, the method further comprising a step of:
establishing advertisement placement criteria based upon at least one of:
the viewer demographics,
the search criteria,
the selected production blocks, and
the viewing history user demographics.

In yet another aspect of the present invention, the method further comprising a step of:
establishing information associated with the viewer demographics to include at least one of:
viewer's first name,
viewer's last name,
viewer's sex,
viewer's date of birth,
viewer's age,
viewer's location,
viewer's level of education,
viewer's socioeconomic status,
viewer's income level, and
viewer's profession.

In yet another aspect of the present invention, the method further comprising a step of:
wherein the advertisement placement criteria is determined by at least one of an advertising party and a broadcasting party.

In yet another aspect of the present invention, the method further comprising a step of:
establishing automated search criteria, wherein the automated search criteria is associated with the viewer.

In yet another aspect of the present invention, the method further comprising a step of:
determining a listing of at least one of the captured production content and the production blocks to the viewer based upon the automated search criteria associated with the viewer; and
presenting the listing of at least one of the captured production content and the production blocks to the viewer.

In yet another aspect of the present invention, the method further comprising a step of:
maintaining a listing of at least one of previously viewed the captured production content and previously viewed the production blocks, wherein the listing of at least one of previously viewed the captured production content and previously viewed the production blocks is stored in a viewer library.

In yet another aspect of the present invention, the method further comprising a step of:
automatically removing one of the at least one of previously viewed the captured production content and previously viewed the production blocks from the viewer library based upon predetermined criteria.

GENERAL OPERATION DESCRIPTION

In order to better interpretation, the following descriptions are supported by the attached drawings.

Step 1: Initially, complete radio and television broadcasts are recorded for use with the Internet portal.

Step 2:—Production System:

The artistic content is analyzed (excluding commercial or advertising content as commercial breaks) to identify intervals corresponding to a unique identifying criteria in order to facilitate the user's interest criteria defined by any of multiple thus defining content blocks. For example, if the recorded program were a Talk Show, and the specific episode contained three (3) different interviews, each with different topics (politics, economy, and sports), each separate interview on each topic would represent a different content block.

The minimal working units or content blocks are identified univocally using the following information:
Airing Channel Station,
Airing date,
Block Start Date Time,
Block length,
Program,
Program Genre,
Block Genre,
Cast present in the block,
Cast, entities or institutions mentioned in the block,
Description or review about the subject treated in the block, and
Flags to highlight current issues or interest for that day, and
Any other attribute that contributes to the facility in searching those content blocks with identity criteria that allows the viewer to go directly to the desired information while minimizing any associated search time.

These attributes are not restrictive from others that could be included in the future.

As a result from this production offering, the process extracts audio, video, and/or audio-video or any combinations thereof, corresponding to each content block from the originally recorded production and as a result of the extraction, the process generates smaller sized files called audio or video cuts.

Information that identifies each cut is recorded in a database that is referred to as a "Content Collection".

Step 3:—Contents Platform:

3.1. —The first time a user accesses the contents platform, the user would be requested to complete a registration process, including a step of entering at least a portion of the following personal data:
User's given or first name,
User's surname or last name,
User's mailing address,
User's email address,
User's gender,
User's birth date,
User's Nationality,
User's residence,
User's education level,
User's socio-economic status, and
Any other attribute as demographic variable.

Once the registration process is completed, the entered data is recorded as part of a file referred to as a "registered users" database.

3.2.—Once registered, the user or viewer begins enjoying audio content blocks, video content blocks, or audio-visual content blocks of their personal interest.

In order to access to the stored and managed content, the user would use a "Selection System". The selection system enables the user to enter searching filters associated with many variables in order to identify preferred blocks. The searching filters can include:
Airing date range,
Airing time period,
Program,
Program genre,
Block genre,
Cast members present in the block,
Cast, entities or institutions mentioned in the block,
Description or review about subject treated in the block, and
Flags or tags linked with topical issues.

According to the variables selected by user, the system shows all the blocks that conform to the selected filters of the searching algorithm. The user can select blocks that the user wants to add to the user's associated "Personal List". The files generated comprising the selected blocks are referred to as a "User List".

Each "User List" is personal and private. There is no access to any "Personal List" from another user, so the user is the only one that knows about audios and videos selected.

3.3.—Another way to select content, that is unique to the proposed invention, is referred to as an alert process or "Block Content Pre-Selection". The alert process allows the user to program the system so as be alerted each time any content aired containing any of the variables belonging to the user's interest. The result of the pre-selection add blocks automatically to the "User List" or "User Library", so it is not necessary to complete a direct searching as described before.

In a review feature, the system saves and alerts the user if any broadcaster aired any content that the system associates with the user's interest.

In an alerts feature, the user can request that the portal save those blocks where any person of interest, such as a celebrity, an athlete, a business executive, and the like appear, blocks where politics are mentioned, blocks where sports teams are mentioned, blocks of concerts associated with a genre of preference, blocks of segments associated with specific religious beliefs, and the like.

Possible pre-selection variables include:
Program,
Block Genre,
Cast present in the block,
Cast, entities or institutions mentioned, and
Flags or Tags linked with topical issues.

The pre-selection variables identified by the user based upon a listing of pre-selection variables are referred to as a "User Pre-Selection" database.

3.4.—Upon completion of the user list, the user can proceed with any of the following options:
Will be able to watch or listen to a content aired the morning before when the user was not able to attend.
Attend to a pre-recorded content without anticipating that programming before the content aired in the recording machine.
Does not need to know in advance that certain content is going to be aired in a specific hour and the content belongs to his interest.
Can select from a menu with every content aired and chose in consequence.
Attend to certain content after hearing about it, for example at the office.
Attend to content in the tablet, personal computer, notebook, Smartphone, etc.
Attend to a content at the office, public places or travelling by train.

3.5.—Every time the user accesses and employs the portal (which would be continuously available and accessible through any Internet accessible device), the portal registers at least a portion of the following:
The content selected (potential content) by the user,
The content effectively played and assisted (real content) by the user,
When the user attended to the content,
The type of device playing the content,
The geographic coordinates where the device is playing the content, and Any other variable that contributes to the "Content Audiences" development.

All data generated is registered in the database associated with the portal as usage information and the file generated is referred to as a "Usage data" database. This usage data is exploited to produce at least one of: "Contents Audiences and Statistics" database and analysis.

Step 4:—Post-Production System:

The Post-Production system purpose is generating "Contents, Audiences, and Statistics".

In order to do so, first it is necessary to obtain a file referred to as a "Country Universe" database.

4.1.—The country universe database is obtained from official census data available from the public government. The information is usually delineated by country, zone or region. The country universe contains every demographic variable in any combination provided.

4.2.—In order to obtain the content audiences, a process is made with the purpose to adjust the obtained sample corresponding to the desired period in usage data so as to obtain a sub-sample representative from the corresponding country universe".

The obtaining of the sub-sample is made of a random process, respecting the quality control on statistics standard needed.

In essence, the process allows that respecting the percentage gave by the country universe for each one of the demographic variables, discarded randomly the data excess that could be in any of the variables so as the sample will be representative from the country universe.

The primary demographic variables used by the portal can include:

A user's gender,

A user's age,

A user's occupation,

A user's education level,

A user's socio-economic stratum, and

Any other attribute as demographic variable.

These variables are combined in order to obtain profiles such as a "woman, housewife, between 30 and 50 years old", "young between 20 and 30 years old with University education", and the like.

The procedures used to obtain "Content Audiences" utilize and adhere to standard procedures used by the Audience Measurement Industry with such measure units like "share", "rating points", "reach", "frequency", and the like.

So, the content audiences data obtained in this context under the exclusive methodology of the portal, complements the traditional audience measurement, and the summarized results from both audiences allow a better understanding of the individual's behavior respective to the audiovisual content.

The subject portal differs from known formats as the contents are centralized on a unique Internet platform (contents portal) where all of the information available for viewing or listening is grouped and is offered in a wide and unified criteria. Additionally, the population sample of the portal is variable, wide, but known because the users of the subject portal must register indicating all demographic variables that identify themselves.

4.3.—Content Statistics:

"Content Statistics" refer to the remaining information that is possible to acquire from a process referred to as "Usage Data", without suitable considerations to a given universe.

These statistics generate very interesting additional information that could identify other tendencies in the user's preference when selecting contents. For example, analyzing deviation: If the country universe corresponding to a certain zone describes a 50/50 male & female or proportion (50% split) and the usage data indicates that the portal is actually used by a ration that is 80% female 80%, the 30% deviation over the distribution is a preference indicative or a distortion in the available contents offer.

Other statistic references that could be obtained by the portal include, for example, people from one country selecting and viewing foreign content or foreign residents selecting and viewing local content, or people out of their origin countries (holidays, etc.) selecting and viewing local content.

Freedom, portability and availability, are inherent concepts to the subject portal that enables more democratic decisions pertaining to content. Consequently, the portal allows studying the individual's behavior facing audiovisual media on the Internet, but in a controlled and massive environment.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

Detailed embodiments of the present invention are disclosed herein. It will be understood that the disclosed embodiments are merely exemplary of the invention that may be embodied in various and alternative forms. The figures are not necessarily to scale, and some features may be exaggerated or minimized to show details of particular embodiments, features, or elements. Specific structural and functional details, dimensions, or shapes disclosed herein are not limiting but serve as a basis for the claims and for teaching a person of ordinary skill in the art the described and claimed features of embodiments of the present invention. The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Figure 18:
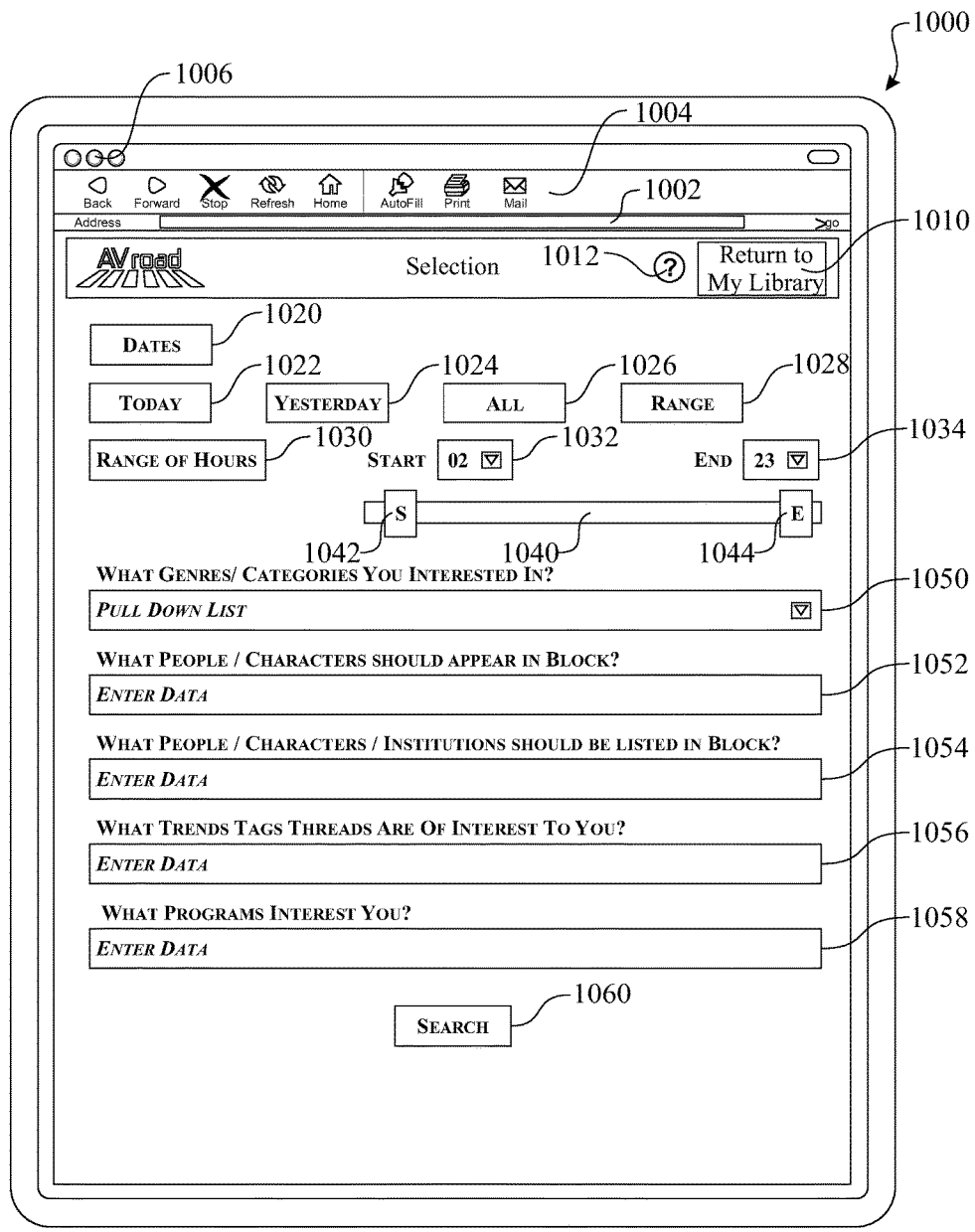
FIG. 18 presents a screen view of an exemplary search criteria entry window of the entertainment and advertisement distribution optimizing system.

For purposes of description herein, any use of the terms "upper", "lower", "left", "rear", "right", "front", "vertical", "horizontal", and derivatives thereof shall relate to the invention as oriented in FIG. 18. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
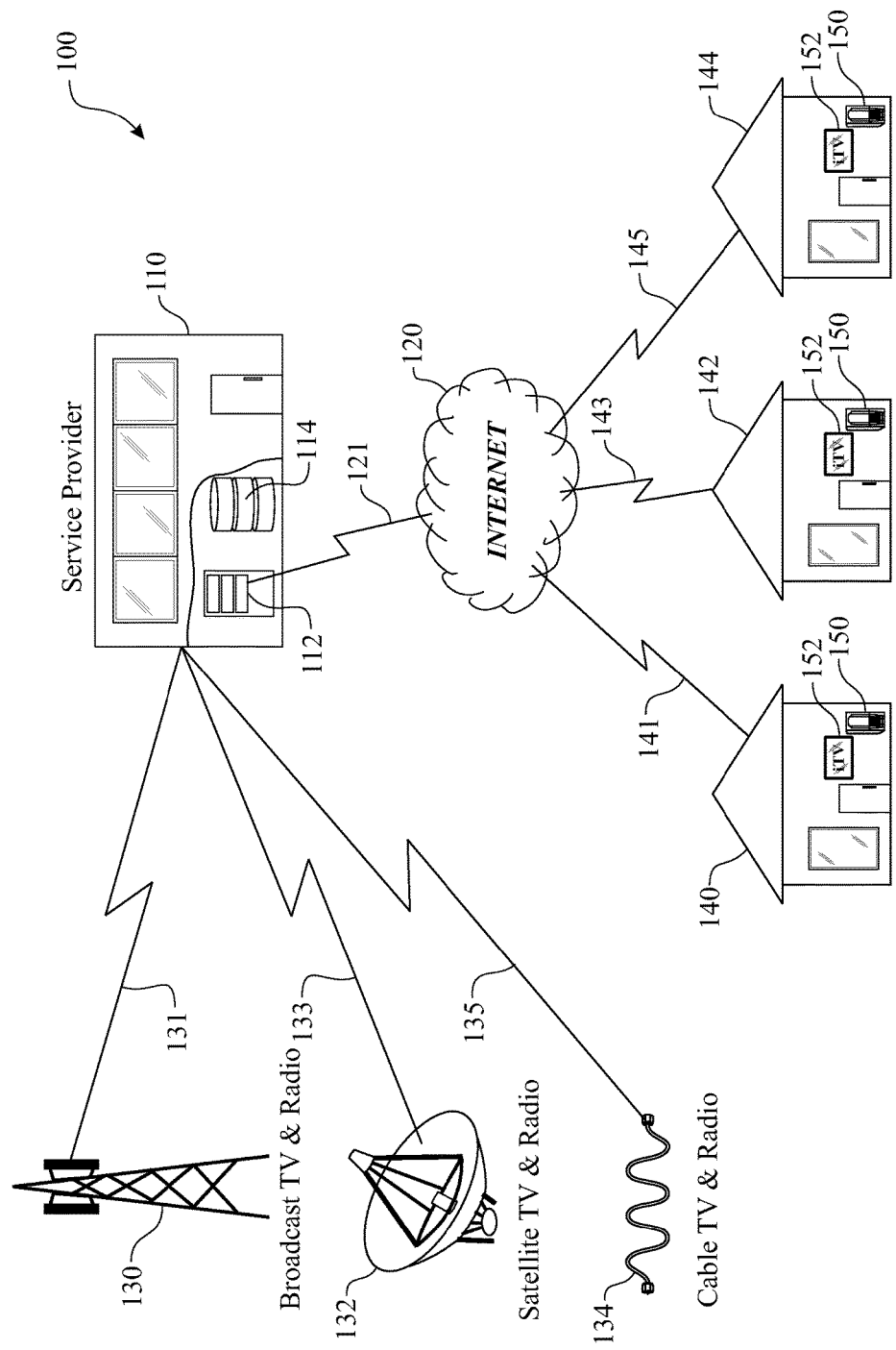
FIG. 1 presents a schematic illustrating an exemplary entertainment and advertisement distribution optimizing network.

An entertainment and advertisement distribution optimizing network 100 is introduced in FIG. 1 and described herein, wherein the entertainment and advertisement distribution optimizing network 100 provides a network solution for distributing video and audio productions in conjunction with optimized target advertising. The entertainment and advertisement distribution optimizing network 100 is presented in a format of a high level exemplary schematic diagram. The entertainment and advertisement distribution optimizing network 100 is operated by a system service provider 110. The system service provider 110 employs a series of entertainment and advertisement distribution optimizing servers 112 in digital data communication with at least one entertainment and advertisement system database storage array 114. The at least one entertainment and advertisement system database storage array 114 manages and stores a digital database of a series of productions, production segments, production blocks, audience user information, advertising campaigns, advertising segments, advertising placement criteria, financial records, and the like.

Production content is received from any of a variety of sources. The exemplary illustration presented in FIG. 1 introduces a local airway broadcast television and radio source 130 provided content using a local airway broadcast television and radio source communication link 131, a satellite television and radio source 132 providing content using a satellite television and radio source communication link 133 and a cable broadcast television and radio source 134 providing content using a cable television and radio source communication link 135. Production content can be delivered using other conventions as well, including physical transfer of data storage media (such as DVDs, USB memory devices, digital data tapes, hard drives, and the like), electronic file transfers using the Internet 120, and the like. Advertising campaigns can be provided to the system service provider 110 for placement upon the entertainment and advertisement system database storage array 114 using any known suitable data transfer process.

The entertainment and advertisement distribution optimizing network 100 utilizes an Internet 120 for distribution of content between the entertainment and advertisement distribution optimizing system 112 and each audience member 140, 142, 144. An entertainment and advertisement system Internet communication link 121 provides signal and data communication between the Internet 120 and each of the at least one entertainment and advertisement distribution optimizing system 112. An audience member communication link 141, 143, 145 provides signal and data communication between each audience member 140, 142, 144 and the Internet 120. The Internet 120 provides communication traffic management between the entertainment and advertisement distribution optimizing system 112 and each audience member 140, 142, 144.

Each audience member 140, 142, 144 would employ at least one user Internet protocol computing device 150 as an Internet enabled device for bidirectional communication with the entertainment and advertisement distribution optimizing system 112. The user Internet protocol computing device 150 would display desired video content on an internet protocol television 152. Each audience member 140, 142, 144 would employ a similar audio output system for emission of the audio productions.

Figure 2:
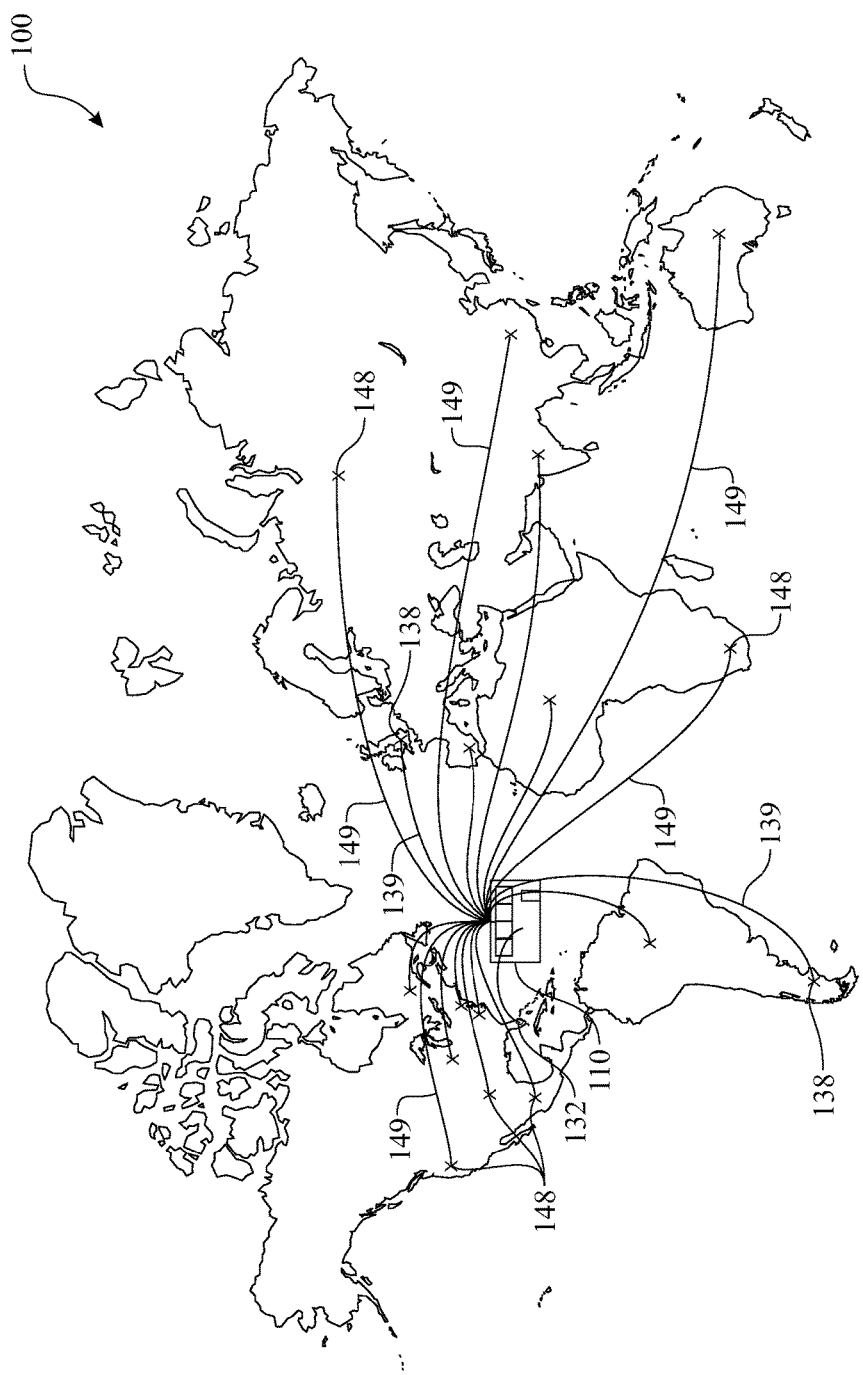
FIG. 2 presents a schematic illustrating an exemplary entertainment and advertisement distribution optimizing network originally introduced in FIG. 1, wherein the exemplary schematic illustrates a global application of the network.

The Internet 120 enables global deployment of the entertainment and advertisement distribution optimizing network 100, as illustrated in the exemplary schematic presented in FIG. 2. In the exemplary embodiment, the system service provider 110 is located in South Florida. The system obtains data from any of a variety of global production content sources, such as a series of exemplary television and radio sources 138 and a series of exemplary regional audience members 148. Each of the exemplary television and radio sources 138 are in digital signal communication with the system service provider 110 through a respective exemplary regional television and radio source communication links 139, wherein each exemplary regional television and radio source communication links 139 employs the Internet 120. Each of the exemplary regional audience members 148 are in digital signal communication with the system service provider 110 through a respective exemplary audience member communication links 149, wherein each exemplary audience member communication links 149 employs the Internet 120.

Figure 3:
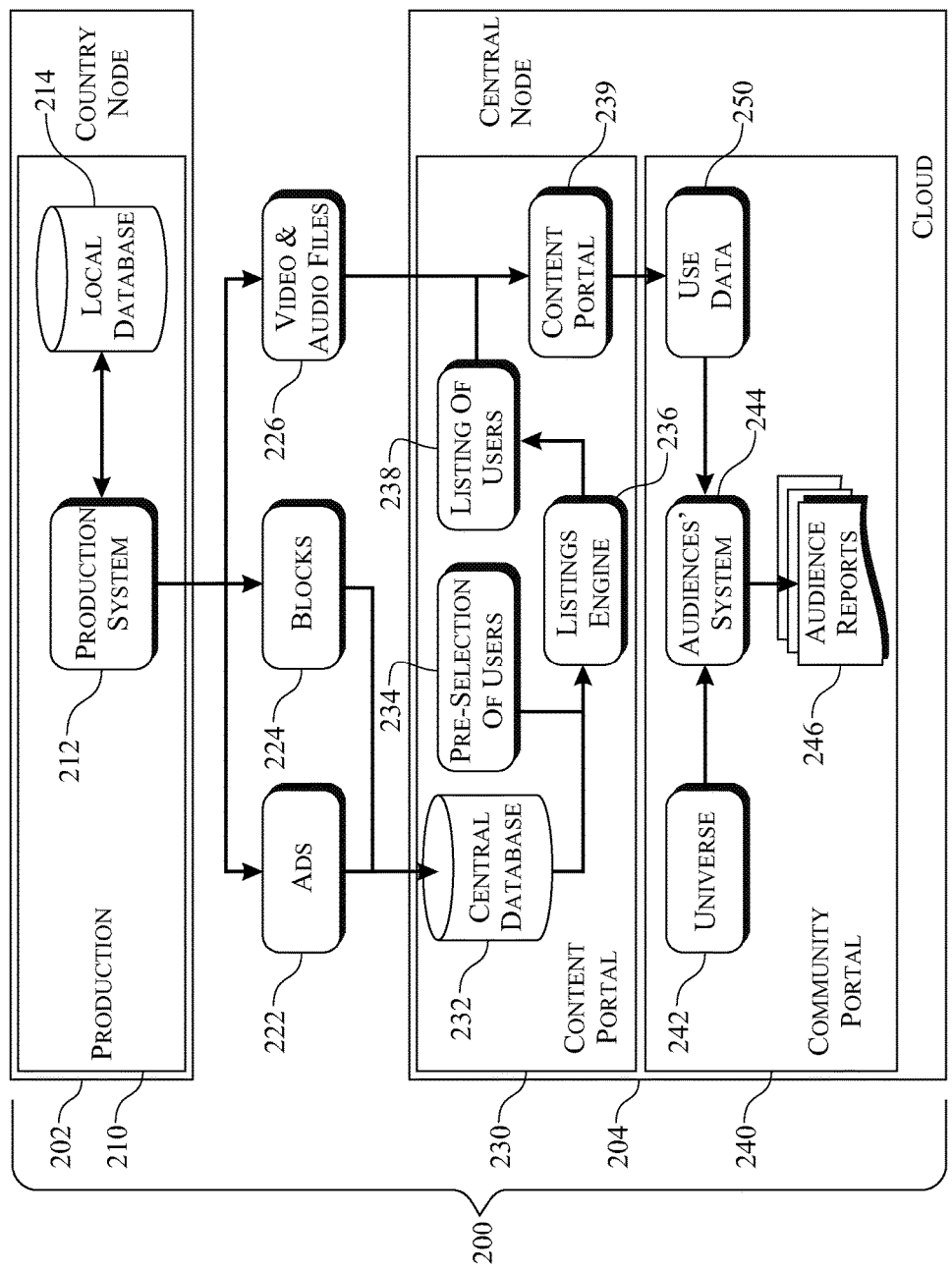
FIG. 3 presents a flow diagram of an exemplary entertainment and advertisement control system.

An exemplary schematic of an entertainment and advertisement control system 200 is illustrated in FIG. 3. The exemplary entertainment and advertisement control system 200 segments the system into a series of regional based production nodes 202 and a central production node 204. Each of the regional based production node 202 includes a regional based production system 210, wherein each regional based production system 210 collects local from local television and radio sources 130, 132, 134 and stores the collected digital production files within one or more regional based production databases 214. The regional based production server 212 processes each collected production into a desired format and forwards the processed content to a central database 232 of a content portal 230, wherein the content portal 230 is controlled by the central production node 204. The regional based production server 212 parses each of the productions into a collection of advertisements 222, a series of blocks 224, and maintains a series of entertainment production files 226. The blocks include segments of the production, indexing data, and the like. The entertainment production files 226 are copies of the production segments in raw data format.

The system manages user information to determine preselected content 234 to be associated with a user's library. The system additionally provides the audience member with access to the complete collection of advertisements 222, and the collection of blocks 224 to add to the audience member's library. The audience member (user) can search from the available production content to provide a complete listing of production segments for viewing and/or listening to. The system includes a listing of users 238 enabling tracking of use to collect metrics for optimizing placement of advertisements. Each of the searching, listing, and viewing processes are accomplished by instructions and digital processing provided by a listings engine 236. The audience member would access the portal and select one or more content production blocks from the audience members library for viewing. The content portal 230 would convey the selected content to the user for viewing and/or listening by way of a content portal interface 239 into a community portal 240. The source data remains on the entertainment and advertisement system database storage array 114 and is processed through the entertainment and advertisement distribution optimizing system 112, thus enabling the entertainment and advertisement distribution optimizing network 100 to obtain or determine use data associated with each content block 250. The production segment of the production block is presented on the audience's system 244. Additionally, the universe 242 provides access of other information to the audience's system 244. The Country Universe 242 file is obtained from official census data available from the public government files usually separated by country, zone or region, that contains every demographic variables in any combination provided. As the production segment is playing, the entertainment and advertisement distribution optimizing system 112 is recording pertinent metrics information. The collected information is recorded in a series of audience member metric reports 246. Each audience member metrics report 246 is tallied within a collective metrics database for analysis by the advertising firm.

One distinct advantage of the configuration is that it enables the entertainment and advertisement distribution optimizing system 112 to obtain detailed information, as the server 112 is involved with all functions of the process. This enables the server to monitor all functions and collect desired metrics pertaining to the audience member or user, the content played for the audience member, the length of time in which the production was played, the time of day in which the production block was played, and the like. The system additionally injects advertisements into the production block. The entertainment and advertisement distribution optimizing system 112 additionally records metrics information associated with the advertisements.

Figure 4:
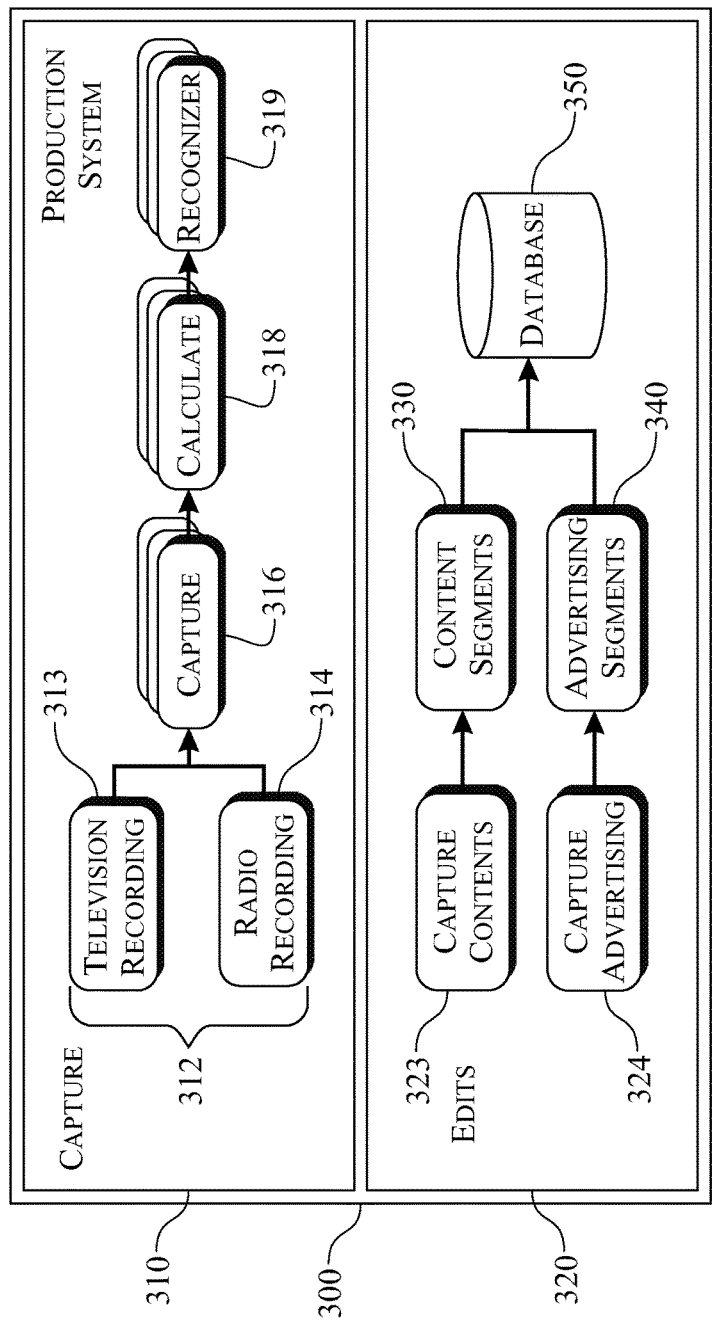
FIG. 4 presents a schematically arranged flow diagram of an exemplary audio/video management system.

An exemplary audio/video management system 300 is presented in FIG. 4. The audio/video management system 300 is segmented into two separate functions: a production capture subsystem 310 and a capture and segmenting subsystem 320. The production capture subsystem 310 processes production content. The capture and segmenting subsystem 320 process advertising campaign content. Within the production capture subsystem 310, the process captures production files 312 using any suitable data capture process (step 316). It is noted that the production files 312 can include at least one of television productions 313 and radio productions 314. Each captured broadcast is segmented in subdivisions of advertisements and/or production segment blocks. Small non-essential content, such as titles, weather forecasts, local advertisements, and the like can be ignored. The captured broadcasts are stored as segmented blocks enabling searching, editing, positioning, etc as desired.

The process calculates (step 318) various data points, including: an advertising fee for placement of an advertising segment with each segment, length of time of each segment, and the like. The system determines various indexing criteria, such as those listed in the exemplary block header index category listing 400 illustrated in FIG. 8. The system reorganizes (step 319) the production files into segments and combines the segments with the indexing criteria to form production segment blocks. In parallel, the capture and segmenting subsystem 320 obtains the captured content from the production capture subsystem 310 and segments and subsequently stores the segmented content. In more detail, the capture entertainment contents 323 is segmented and classified by the various indexing criteria. The segmented and classification information is stored as a content segment or block segment 330. The content or block segments 330 are stored on the entertainment and advertising database 350. Advertising segments are processed in a similar manner. The advertising campaigns 324 are provided or captured. The advertising campaigns 324 are segmented or prepared into presentation formats. Advertising placement indices are determined and assigned to the advertising segment 340 and stored on the entertainment and advertising database 350. The placement indices can be combined with the advertising segment and stored as an advertising block or stored separately and associated with one another by an index. The advertising placement indices are determined to coincide with audience member information, production segment information, or any other specific indexing element that would optimize a presentation of the advertisement to a targeted audience member.

Figure 6:
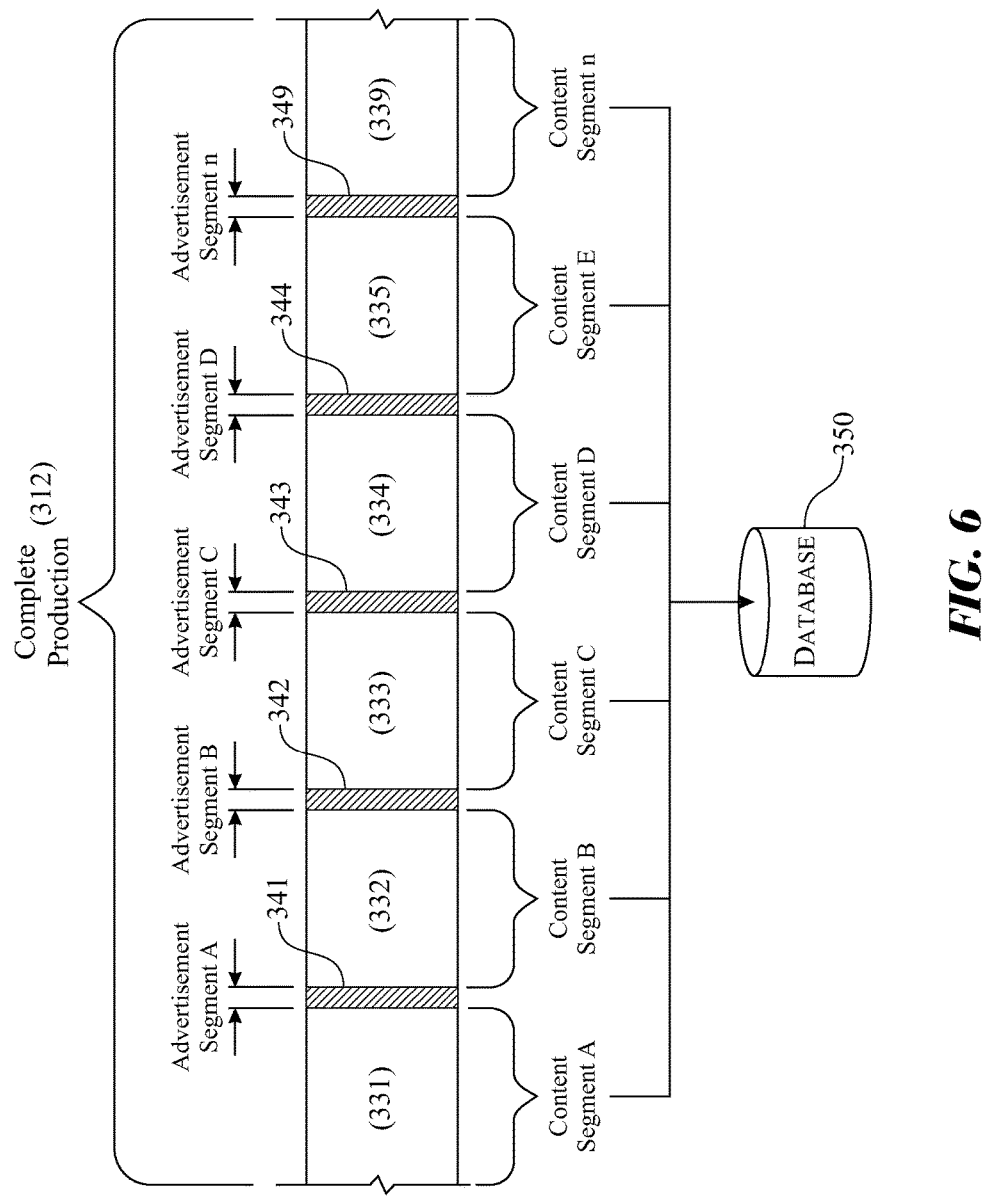
FIG. 6 presents a schematic configuration demonstrating an exemplary production segmenting and sequencing process.

The production capture subsystem 310 is further detailed in an exemplary broadcast processing overview flow diagram 360. The process captures or records the broadcasted television productions 313 and/or the broadcasted radio productions 314 (step 362). The broadcasted television productions 313 and/or the broadcasted radio productions 314 are obtained from the local airway broadcast television and radio source 130, the satellite television and radio source 132, the cable broadcast television and radio source 134, and the like. The recorded transmissions are identified using any suitable production identification process (step 364). The production can be identified using tags embedded within the transmissions, utilizing outside resources, such as Internet websites, information provided by broadcasting companies, and the like. The production content is segmented into content segments 331, 332, 333, 334, 335, 339 (FIG. 6) (Step 366). The advertising campaign is also segmented 366 into advertising segments 341, 3342, 3343, 344, 349 (FIG. 6). Each content segment is characterized and indexed forming a content block (step 368). The indexing characterization compliments the search criteria established by the system service provider 110. The information and production segments are formatted into suitable formats for indexing and playback using any predetermined playback device, including iTV 152, Internet supported computers, Internet supported computing tablets, Smartphones, and the like (step 370). The indexing characterization and associated production blocks/segments are stored on the entertainment and advertisement system database storage array 114 (step 372).

A complete production 312 is compiled by combining a series of production/content segments, as illustrated in FIG. 6, wherein the exemplary production files 312 includes an opening production segment 331, a second production segment 332, a third production segment 333, a fourth production segment 334, a fifth production segment 335, and nth production segment 339. An advertising segment 341, 342, 343, 344, 349 is inserted between adjacent sequentially arranged content segments, such as an opening advertising segment 341 being inserted between the opening production segment 331 and the second production segment 332. Collectively, the series of production segments 331, 332, 333, 334, 335, 339 and interjected series of advertisements 341, 342, 343, 344, 349 are combined into the production files 312. The individual components, an index, and/or the production files 312 can be stored on the entertainment and advertising database 350 for viewing or listening by the audience member. It is understood that the production segments 331, 332, 333, 334, 335, 339 can be sequentially provided from a single production or individually selected by the audience member.

Figure 7:
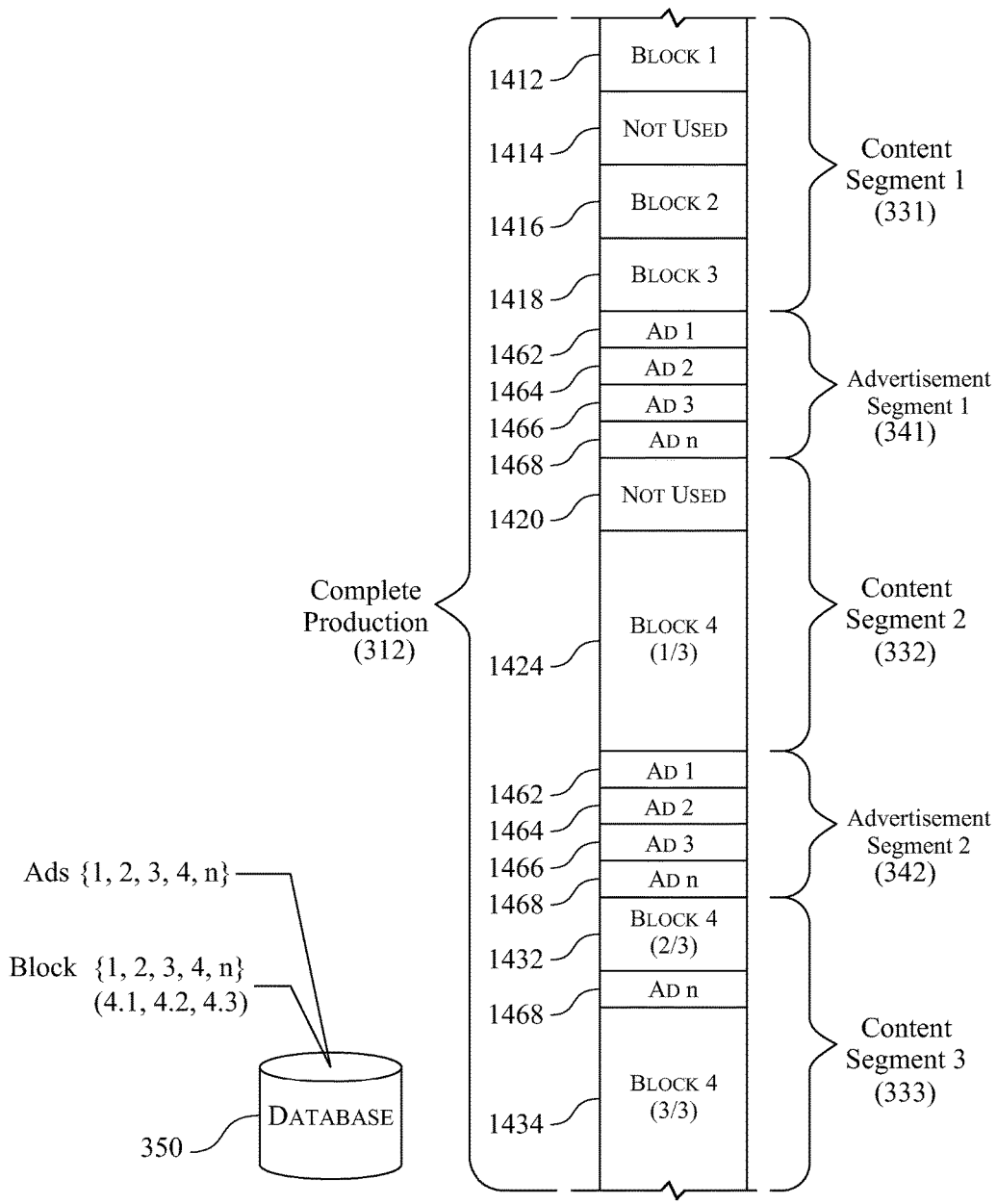
FIG. 7 presents a more refined schematic configuration introducing details of the exemplary production segmenting, sequencing process, and advertisement compilations.

A more refined schematic configuration derived from the exemplary production segmenting and sequencing process of FIG. 6, is presented in FIG. 7. The more refined schematic configuration introduces details of the exemplary production segmenting, sequencing process, and advertisement compilations. Each content segment 331, 332, 333 comprises a series of content blocks 1412, 1416, 1418, 1424, 1432, 1434, advertisement block 1462, 1464, 1466, 1468, and unused segment blocks 1414, 1420. In the exemplary embodiment, the first content segment 331 is configured by combining block 1 (1412), block 2 (1416), and block 3 (1418) into a single segment. One segment block is unused 1414.

The unused segment or segments 1414, 1420 is/are provided to accommodated technical problems, while other unused segments 1414, 1420 would exclude any interesting content or are just filling time to complete the transmission. For example, one unused segment 1414, 1420 would accommodate spacing, glitches or other production related issues. In a second example, the unused segment 1414, 1420 would accommodate appropriate timing, such as in a news report, a weather report or enumeration of the titles of the day, these contents are no longer relevant 2 or 3 days after the initial release of the production content. Therefore, an inappropriate or ill-timed segment block would be removed from the production content segment 331, 332, 333. In another example, a story where the reporter is waiting for a person to appear and the reporter does not really know when that will happen. The resulting broadcast would spend a significant amount of time (i.e. minutes) showing an image and repeating the same image or short video segment (in the exemplary embodiment, the filling or unused segment 1414, 1420 is a result of a lack of content, simply using a repeated broadcast). In yet another example, during a sporting event, a timeout occurs for some reason the cameras spend minutes doing a visual stroll through the stands (thus filling airtime for lack of content).

Advertisements are inserted between content segments 331, 332, 333 or within segments, such as the advertisement block 1468 included within the third content segment 333. Advertisements can be provided individually such as the advertisement block 1468 included within the third content segment 333 or in blocks, such as the advertising segment 1 (341) and the advertising segment 2 (342). In the exemplary embodiment, advertising segment 1 (341) comprises four advertisement blocks 1462, 1464, 1466, 1468. In the exemplary embodiment, advertising segment 2 (343) also comprises four advertisement blocks 1462, 1464, 1466, 1468. It is understood that the content segments 331, 332, 333 and the advertising segments 341, 342 can be configured to include any number of production blocks and/or any number of advertising blocks. All of the blocks and arrangement of blocks would be stored within the entertainment and advertising database 350.

Figure 8:
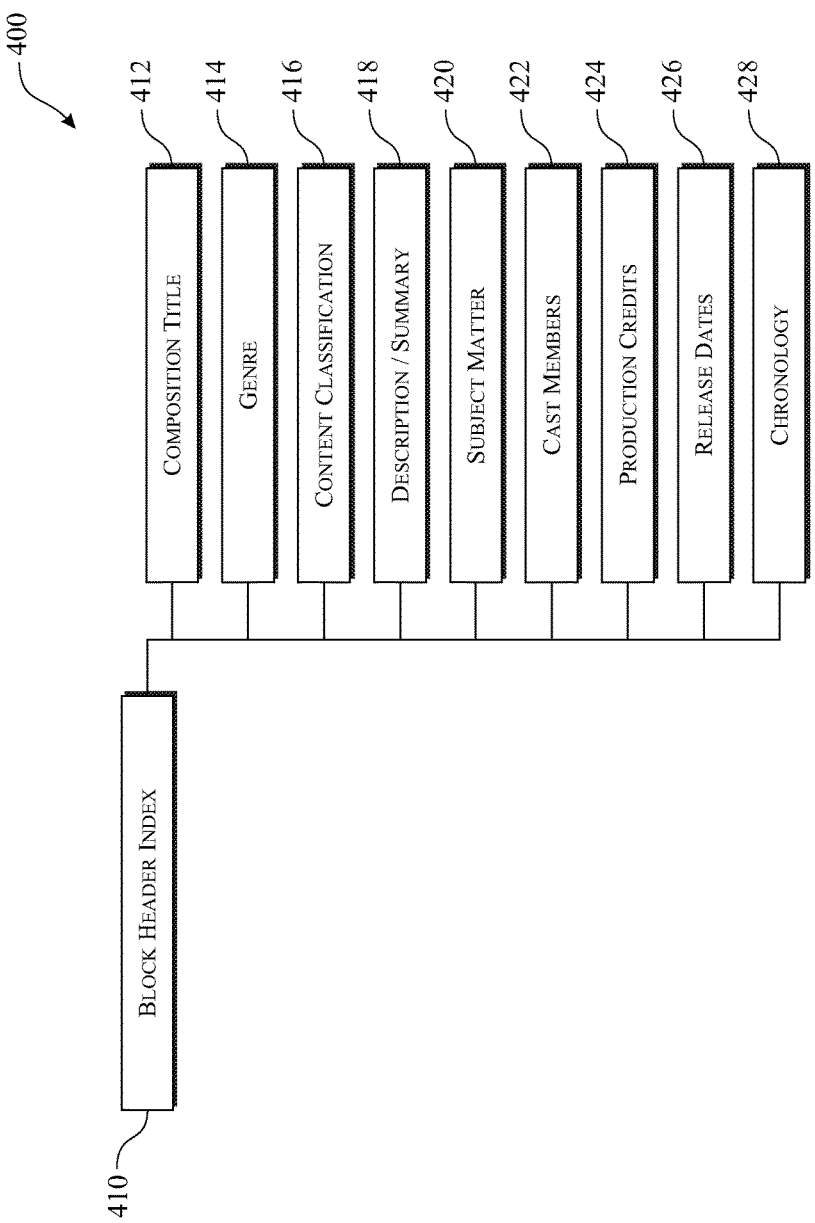
FIG. 8 presents a listing of an exemplary content categories index.
Figure 9:
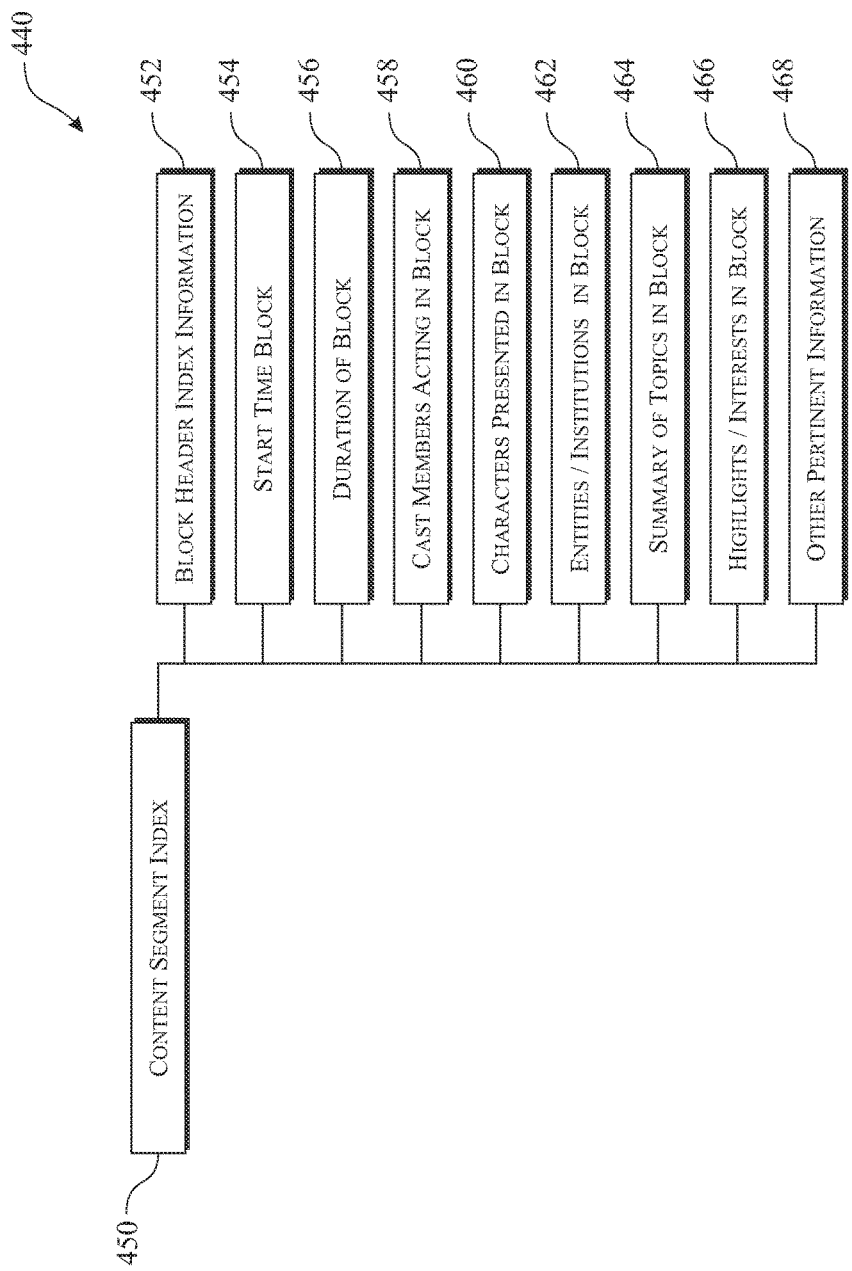
FIG. 9 presents a listing of an exemplary content segment categories index.

The indexing characterization can include any suitable element description related to the complete content. An exemplary block header index category listing 400, as illustrated in FIG. 8, lists a series of exemplary indexing categories defining a block header index 410, wherein the block header index 410 includes: a content title 412, a genre 414, a content classification 416, a description and/or summary 418, a subject matter 420, a cast members 422, a production credits 424, a release dates 426, and a chronology 428. It is understood that additional categories, descriptions, or other features can be included in the indexing characterization. Similarly, each segment can be characterized for searches. The production or content segment indexing characterization can include any suitable element description related to the complete content. An exemplary content segment index category listing 440, as illustrated in FIG. 9, lists a series of exemplary indexing categories defining a content segment index 450, wherein the block header index 410 includes: a block header index information 452, a start time of the segment/block 454, a duration of the segment/block 456, a cast members acting in the content segment/block 458, a characters presented in the content segment/block 460, an entities/institutions presented in the content segment/block 462, a summary of topics in the content segment/block 464, a highlights and/or interests shown in the content segment/block 466, and an other pertinent information associated with the content segment/block 468. It is understood that additional categories, descriptions, or other features can be included in the indexing characterization.

Figure 10:
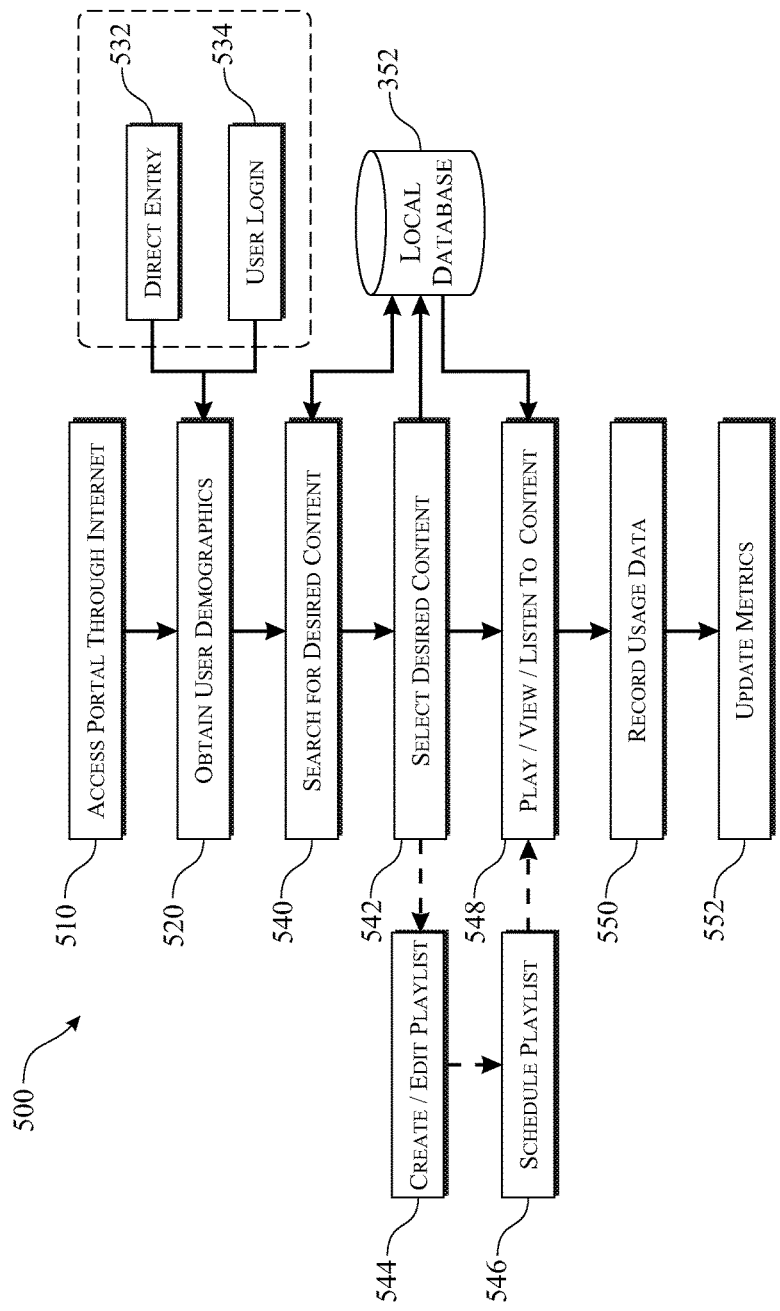
FIG. 10 presents a schematically arranged flow diagram of an exemplary production presentation process.

Upon completion of the indexing and configuration of each production, the entertainment and advertisement distribution optimizing system 112 is prepared for interaction with the audience. An exemplary overview of the interaction, referred to as production presentation process flow diagram 500, is presented in FIG. 10. The audience member accesses the entertainment and advertisement distribution optimizing system 112 through the Internet 120 in accordance with a portal access (step 510). The entertainment and advertisement distribution optimizing system 112 obtains demographics (step 520) associated with the audience member through a user demographics entry procedure (step 530). The user demographics entry procedure 530 can obtain the audience member demographics through at least one of a user demographics direct entry procedure (step 532) and a member demographics log-in based acquisition procedure 534. Details of the user demographics entry procedure (step 530) will be described shortly. The audience member initiates a search 540 of the available production content. The search (step 540) can be within their user library or of all available production content to add production blocks to their user library. Details of the searching process and library management are presented in an exemplary user library utilization process flow diagram 700 shown in FIG. 13. The searching process interacts with either an entertainment and advertising database 350 or a local database 352 (as shown) to return a listing of production segments/blocks which meet the criteria established by the provided searching criteria. The audience member selects the desired production blocks (step 542) from the returned listing of production segments/blocks which meet the criteria established by the provided searching criteria. The audience member can create a playlist (step 544) from the selected production segments/blocks. The audience member can optionally schedule (step 546) play of the selected production segments/blocks of the playlist. Once selected, the user enjoys the entertainment provided by the production segments/blocks (step 548). Since the information and all interactions are provided through the entertainment and advertisement distribution optimizing system 112, the entertainment and advertisement distribution optimizing system 112 obtains and records (step 550) the associated production segment/block indexed information and the audience member demographics. The recorded production segment/block indexed information and the audience member demographics are utilized to update the overall available metrics (step 552).

Figure 11:
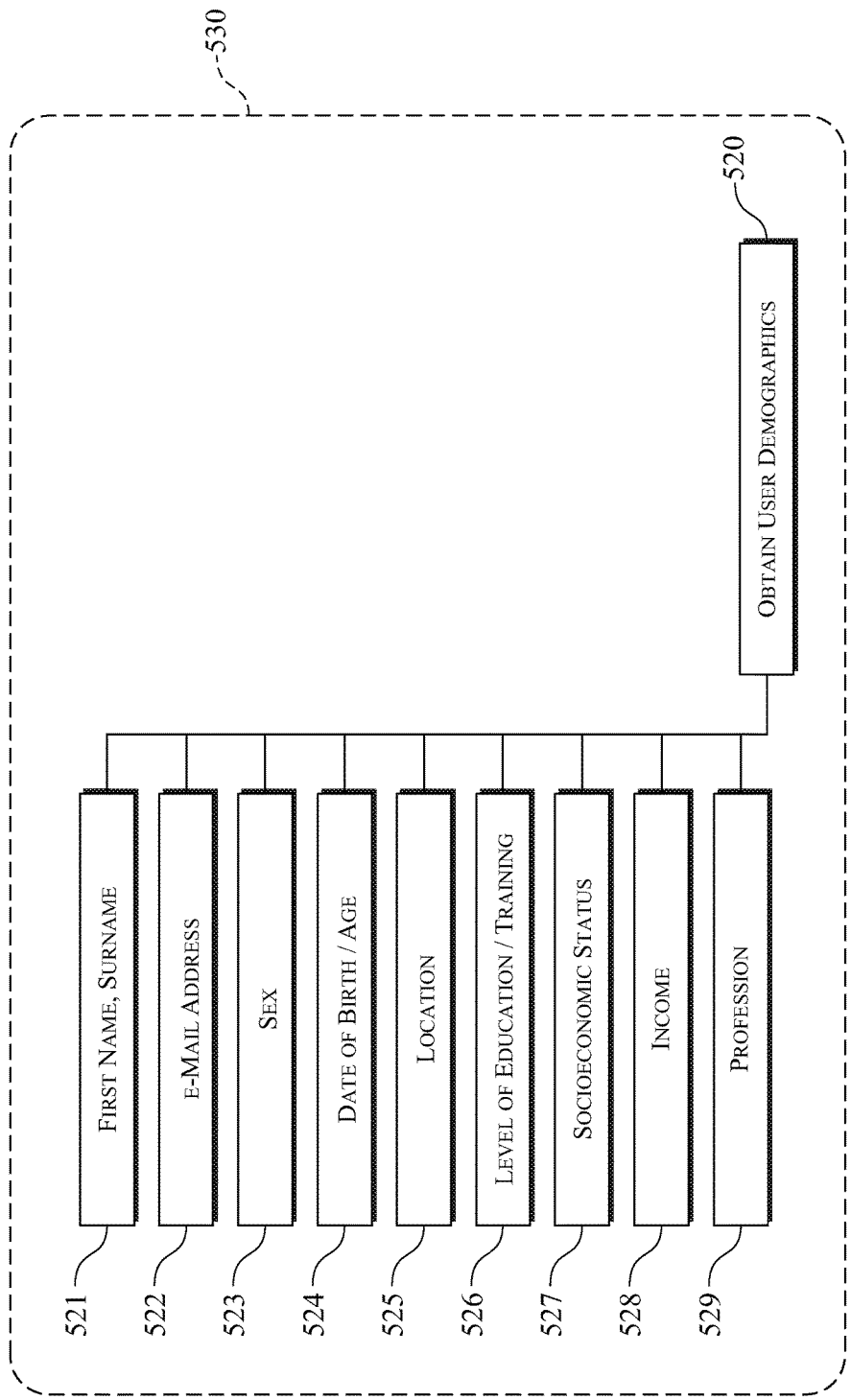
FIG. 11 presents a schematically arranged flow diagram of an exemplary user demographics entry procedure.

An exemplary user demographics entry procedure 530 is illustrated in FIG. 11. The exemplary user demographics entry procedure 530 lists a series of audience member demographic categories including: a user's name 521, a user's email address 522, a user's sex 523, a user's date of birth and/or age 524, a user's residence and/or current location 525, a user's level of education/training 526, a user's socioeconomic status 527, a user's income level 528, and a user's profession 529. It is understood that additional categories, descriptions, or other features can be included as other audience member demographics. The audience member demographics can be obtained when the audience member initially establishes an account, by way of sharing through an account associated with a separately operated social networking site, manually entered when the audience member is utilizing the entertainment and advertisement distribution optimizing network 100 as a guest, and the like. The system can require entry of a minimum listing of audience member demographics prior to offering the audience member access to the available production content.

An audience user profile interface 1200 presents an exemplary interface for entry or editing of audience member profile or demographics. The audience user profile interface 1200 is preferably a graphical user interface provided in a format of an internet based webpage. The webpage would include any commonly associated functions, including an address bar 1002, an interface page tool bar 1004, and a window size and location control icons 1006. The graphical user interface can include navigation icons, such as a return to library link 1010, a link to a system home page, a help link 1012 (FIG. 18) and the like. Each graphical user interface can optionally include a learn more feature link 1230 to provide more information to the user about the specific feature and/or the overall system. The audience user profile interface 1200 includes entry windows for each of the user profile demographics, such as those included within the user demographics entry procedure 530. The user profile can optionally include an audience user profile photo 1210. The audience member would select the audience user profile photo 1210 to introduce, edit, or replace the image. The exemplary audience user profile interface 1200 includes a portion of the previously introduced demographics. The audience user profile interface 1200 preferably presents the user demographics in an organized arrangement within an audience user profile edit window 1220. The exemplary audience user profile edit window 1220 presents a series of basic user demographics, including an audience user first name edit window 1221, an audience user surname/last name edit window 1222, an audience user sex selector 1223, an audience user birth date entry feature 1224, and an audience member default residing country selector 1225. Once the user enters the associated person information into the listings within the audience user profile edit window 1220, the user would verify the entries and select a save profile icon 1226.

Figure 12:
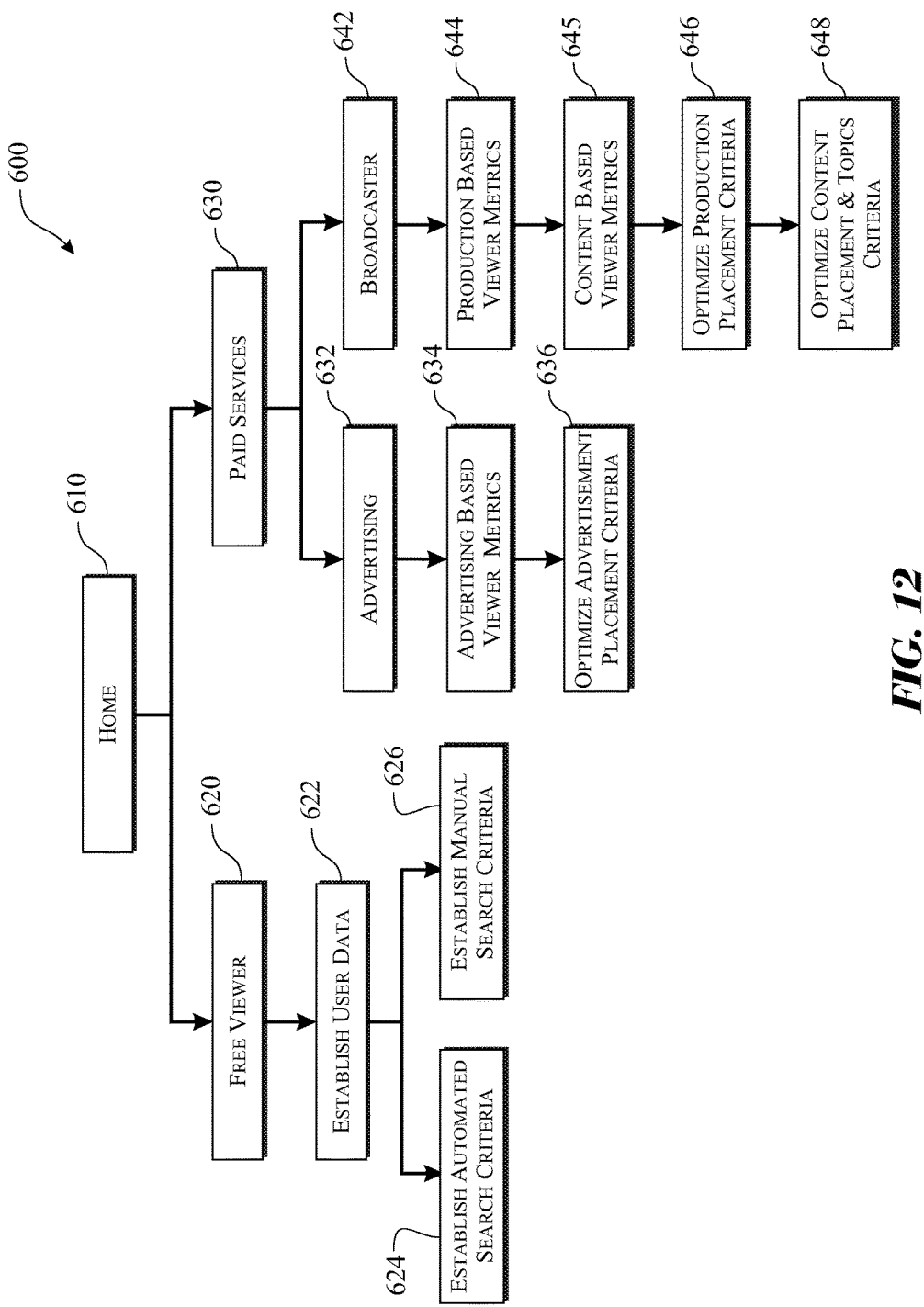
FIG. 12 presents a flow diagram of an exemplary initial system access.

The entertainment and advertisement distribution optimizing network 100 relies upon two distinct user groups. Access can be provided through independent routes or through a single access portal as illustrated in the exemplary initial system access flow diagram 600 presented in FIG. 12. The user would access the portal home page 610 through an Internet browser or similar functioning tool using the user Internet protocol computing device 150. Upon accessing the portal home page 610, the system would direct the user to create a user account or log in using an existing user account. The system 112 would determine whether the user is an audience member and would proceed with audience member access 620 or a paid user and proceed with a paid participant access 630. Paid users would include broadcast service providers, advertisers, and the like.

Following a path for free users, the audience member would establish a user data account (step 622), which would include associated audience member demographics. If the associated audience member demographics were previously provided, the system creates an association between the logged in user and the associated audience member demographics for use in collection of user metrics. The process proceeds with a step of establishing search criteria using at least one of search criteria for automated searches establish automated search criteria (step 624) and search criteria for manual searches (step 626).

Following a path for paid users, the paid member groups are segmented into two sub-groups: advertisers, which would be provided advertisers and advertising agencies access (step 632) and broadcasters, which would be provided a broadcaster participant access (step 642). The advertising parties would review advertising based viewer metrics (step 634) and use the obtained metrics to optimize campaign placement criteria (step 636) associated with each advertising production or smaller advertising segment. The placement criteria can be modified to more distinctly direct placement of each advertising production or smaller advertising segment in a manner to target a specific demographic or series of demographics to increase a number of potential customers. Similarly, broadcasters would review production based viewer metrics (step 644) as well as content based viewer metrics (step 645) and use the obtained metrics to optimize, improve, or modify productions or contents (step 646) or modify placement criteria and topics criteria (step 648) to increase viewers.

Figure 13:
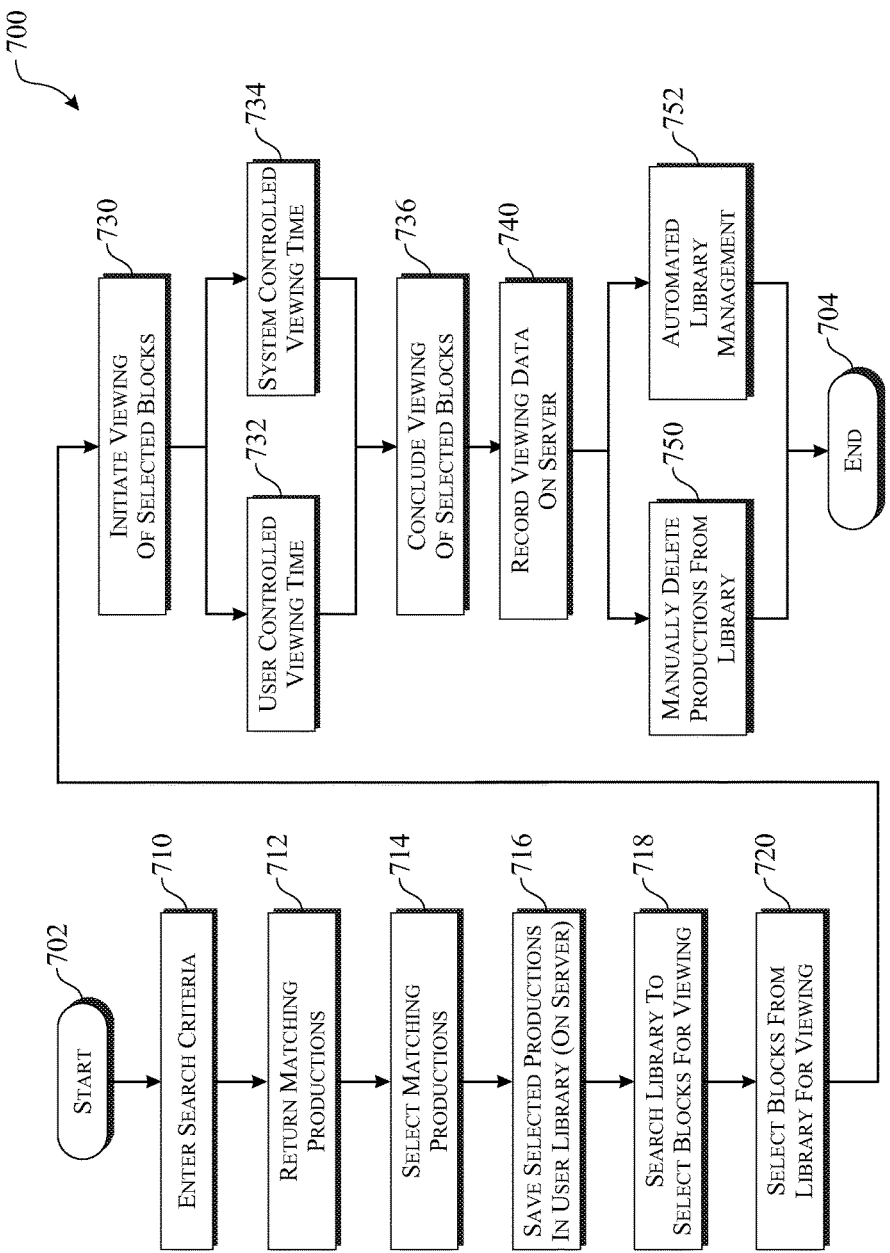
FIG. 13 presents a flow diagram of an exemplary search criteria entry procedure.

One primary element of the entertainment and advertisement distribution optimizing network 100 is the user library. The user library can include a list or index to productions, production segments, or blocks that the user desires to view or save for viewing at a later date. From an advertiser's position, metrics pertaining to saving the production within the users library indicates interest and the number of views and or length of time in of viewing the production, production segment, or block indicates a level of interest in the production. An exemplary user library utilization process flow diagram 700, as illustrated in FIG. 13, describes a series of steps a user would take to interact with and utilize their user library. The process initiates (start step 702) by accessing a search function provided by the entertainment and advertisement distribution optimizing system 112. The user enters search criteria based upon the design of the feature.

An exemplary search interface 1000 is presented in FIG. 18. The exemplary search interface 1000 introduces several search criteria and boundaries for locating content segments. In an upper section of the exemplary search interface 1000, the user can define a range of dates and/or times in which the production was originally broadcast. The time management portion of the exemplary search interface 1000 is identified by a reference header. In the exemplary embodiment, the function includes a dates calendar link 1020, which opens a calendar. The user would select a single date, a sequential series of dates, or a plurality of randomly arranged dates. The date selection function can offer a today's date quick entry 1022, wherein the user would desire to search productions that were released today. The date selection function can offer a yesterdays date quick entry 1024, wherein the user would desire to search productions that were released the previous day (yesterday). The date selection function can offer an all dates quick entry 1026, wherein the user would desire to search productions independent of the release date. The date selection function can offer a range date entry request icon 1028, wherein the user would desire to search productions released within a range of dates. The user would be directed to enter a range of dates using any suitable process. In addition to the dates selection function, the search feature offers a search by hours function. The user would identify a start time (preferably in 24 hour format) and an end time (preferably in 24 hour format). In a first exemplary embodiment, the user can manually enter the start time and end time within a range of hours 1030. In a second exemplary embodiment, the user can enter the start time using a start hour selector 1032 and an end time using an end hour selector 1034. Each of the selectors is a pull down menu comprising a listing of hours in either a 12 hour format or a 24 hour format (as shown). In a third exemplary embodiment, the user can enter the start time by sliding a hour selector start slide icon 1042 along a hour selector slide bar 1040 and an end time by sliding a hour selector end slide icon 1044 along the hour selector slide bar 1040.

Search criteria can be entered in accordance with each of a series of listing. An exemplary series of search criteria listings are presented in the exemplary search interface 1000. A first exemplary search criteria entry is a genre/categories selector 1050, wherein the user would select a genre or category from a pre-populated pull down listing of categories. A second exemplary search criteria entry is a person/character/actor appearance data entry feature 1052, wherein the user would manually enter a name of a person, actor, or character that is included in the production or production segment. A third exemplary search criteria entry is a person/character/actor/location/institution credited data entry feature 1054, wherein the user would manually enter a name of a person, actor, character, location, institution, creator, director, writer, producer, costume director, lighting director, film producer, stunt person, sound producer, musician, stage director, and the like that supports the production or production segment. A fourth exemplary search criteria entry is a trends or other tags data entry feature 1056, wherein the user would manually enter words associated with a tag line, a storyline, a catch phrase, a key moment, and the like that are associated with the production or production segment. A fifth exemplary search criteria entry is a specific programs of interest data entry feature 1058, wherein the user would manually enter words associated with a specific program, program type, program format, series, and the like respective to the production or production segment. The search criteria would not be limiting, wherein the audience member can enter search criteria into one or more of the available search data entry fields. Once the user is comfortable with the entered search criteria, the user would select a search submission icon 1060 to initiate a search.

Returning to the exemplary user library utilization process flow diagram 700 of FIG. 13, upon submitting a request for the search, the process continues by returning productions, production segments, and production blocks that meet at least a portion of the submitted search criteria (step 712). The returned productions, production segments, and production blocks can be presented in any suitable arrangement. The arrangement may be predetermined by the system or configurable by the user. The user would select any desirable productions, production segments, and production blocks from the returned list (step 714). The selected productions, production segments, and production blocks would be included within the user's library, wherein the user's library is stored upon the entertainment and advertisement system database storage array 114 (step 716). The productions, production segments, and production blocks can be copied into the user's library or included by a reference link to reduce overall storage space on the entertainment and advertisement system database storage array 114. The user would subsequently search their user library to identify one or more productions, production segments, and production blocks for viewing (step 718). The user would select one or more productions, production segments, and production blocks from the presented listings from the subsequent search for viewing (step 720). Once selected, the process would initiate viewing of the selected productions, production segments, and production blocks (step 730). The viewing process can be manually initiated or automatically initiated by the entertainment and advertisement distribution optimizing system 112. Each of the selected productions, production segments, and production blocks can be viewed independently or sequentially based upon either user selected criteria or system determined criteria. The productions, production segments, and production blocks are presented until they conclude or until either the user elects to prematurely terminate the presentation. A premature termination can be open enabling the user to terminate the presentation at any point in time (step 732) or limited by the system, wherein the system mandates a minimum viewing time (step 734). The system continues through a viewing conclusion of all of the selected productions, production segments, and production blocks (step 736). The system obtains and records demographics of the audience member and metrics associated with each of the selected and viewed productions, production segments, and production blocks (step 740). The productions, production segments, and production blocks would remain within the users library until either manually deleted (step 750) or automatically deleted by the system based upon predetermined criteria (step 752). Examples of how an automated deletion can be determined include being based upon time since added to the library, time since the original production release, time since the production was last viewed, least frequency of viewing, termination or request from the broadcaster or producer of the production, and the like. It is also understood that the criteria established by the audience member can be used as a basis for automated removal of productions, production segments, and production blocks matching the criteria from the user library. It is understood that the user can transition between searching and playing as desired. The user ends the session when desired (termination step 704).

Figure 17:
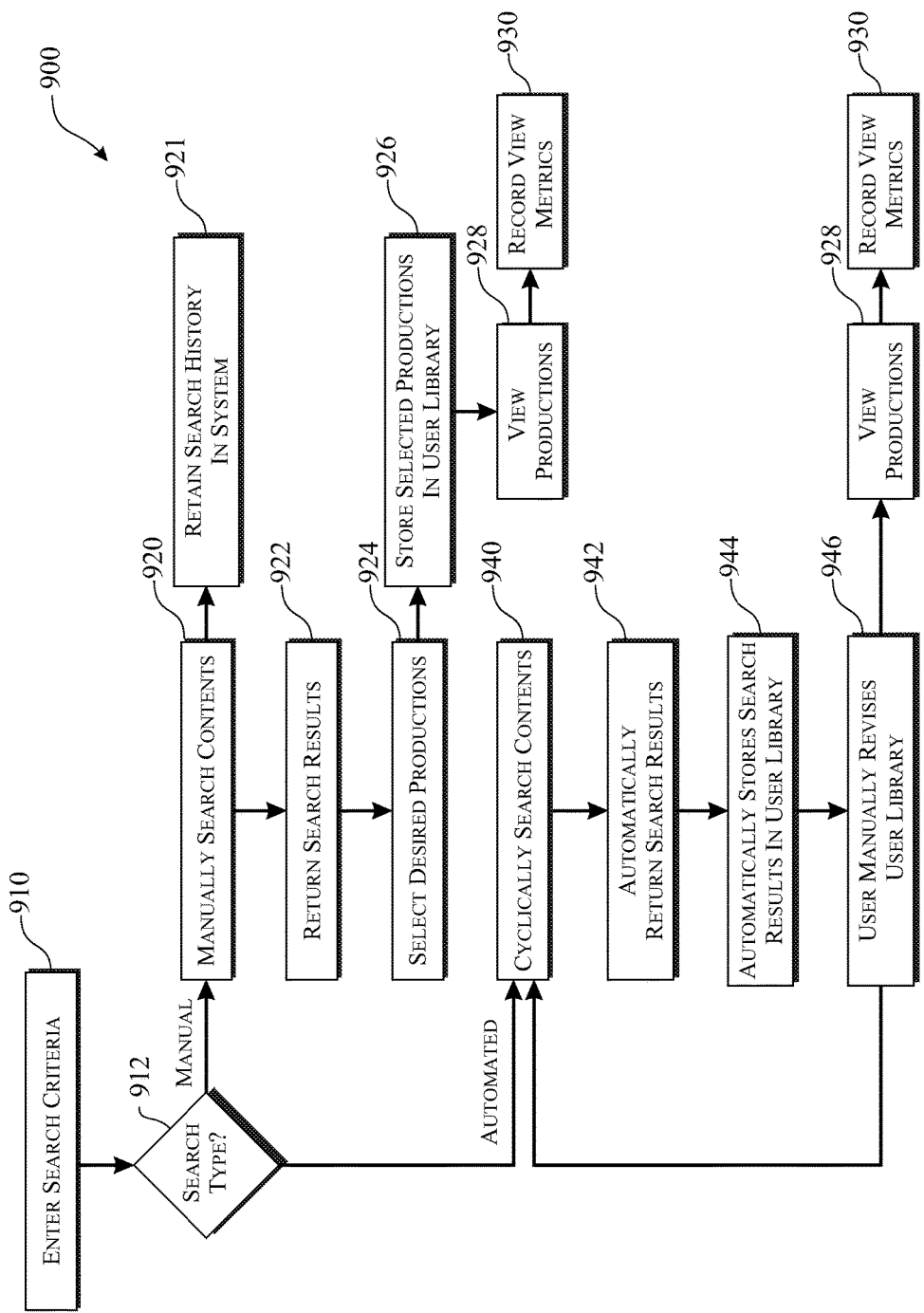
FIG. 17 presents a schematically arranged flow diagram of an exemplary production block search procedure.

The searching process can be accomplished by a manual search process and/or an automated, cyclical search process, as detailed in an exemplary search process flow diagram 900, presented in FIG. 17. The process initiates with the audience member entering the search criteria (step 910). The audience member would determine and select a search type in accordance with a search type decision step 912. The search can be accomplished as a manual search and/or an automated search.

When selecting a manual search process, the user enters the search criteria and submits a request to initiate the search. The entertainment and advertisement distribution optimizing system 112 returns productions, production segments, and production blocks matching the entered search criteria (step 922). The returned results are displayed in any suitable format for the user to review. The user reviews the returned search results and selects the desired productions, production segments, and production blocks from the returned list. The selected productions, production segments, and production blocks are then stored within the user's library (step 926). As previously presented, the entertainment and advertisement distribution optimizing system 112 can store complete copies of the selected productions, production segments, and production blocks, store a reference, link, or other identifier to index the library. The audience member would subsequently view at least one of the productions, production segments, and production blocks from their user library (step 928). Information associated with the audience members searching, selections, and viewing is recorded as user and viewing metrics (930).

When selecting an automated search process, the user enters the search criteria and submits a request to initiate the automated search. The entertainment and advertisement distribution optimizing system 112 cyclically searches (step 940) and returns productions, production segments, and production blocks matching the entered search criteria (step 942). The returned results are temporarily stored and identified as productions, production segments, and production blocks, which were newly added into the user's library by the automated search cyclical process (step 944). The process would be completed based upon any established time-based cycles until the user cancels the automated search. For example, the user can request daily searches for a period of one month. The system would complete a search each day, at the same time, for a period of one month. The results of each search would be added to the user's library, understanding that replicated productions, production segments, and production blocks would not be added. The user reviews the newly added productions, production segments, and production blocks placed within their library and selects the desired productions, production segments, and production blocks of the newly added material. The selected productions, production segments, and production blocks remain stored within the user's library and the unwanted productions, production segments, and production blocks are removed from the user's library (step 946). The system can optionally retain a list of previously removed productions, production segments, and production blocks and ensure that the removed productions, production segments, and production blocks are not replaced during subsequent automated searches. The audience member would subsequently view at least one of the productions, production segments, and production blocks from their user library (step 928). Information associated with the audience members searching, selections, and viewing is recorded as user and viewing metrics (930).

Figure 19:
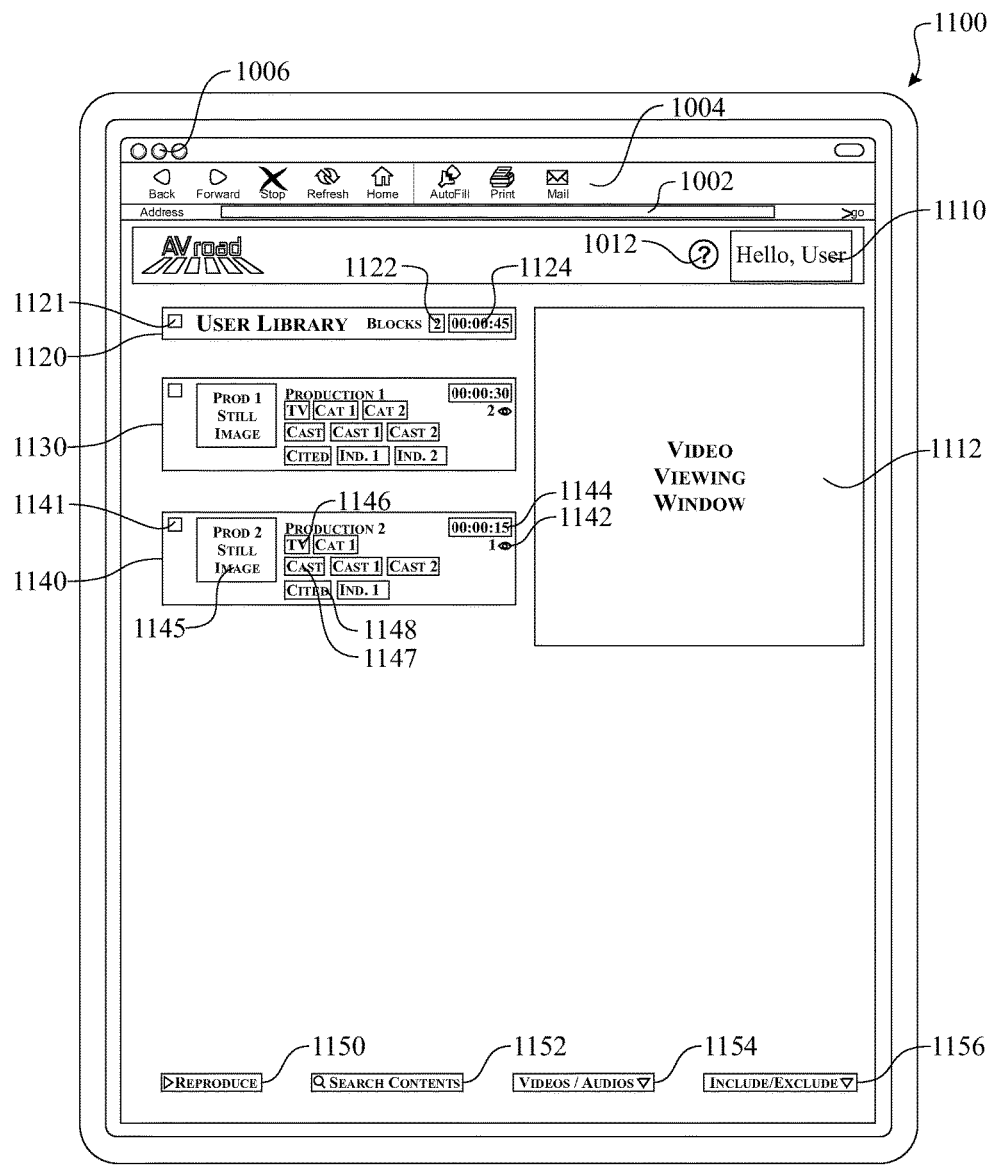
FIG. 19 presents a screen view of an exemplary audience user production library selection interface window of the entertainment and advertisement distribution optimizing system.

An exemplary user production library selection interface 1100 is presented in FIG. 19. The user production library selection interface 1100 presents a graphical user interface for managing and viewing productions, production segments, and production blocks associated with the user's library. The user production library selection interface 1100 can include a user identification 1110 to inform the audience member that they are properly logged into the entertainment and advertisement distribution optimizing system 112. The user production library selection interface 1100 can optionally include a user production library summary window 1120, which provides the user with a quick summary of their library, including the number of productions, production segments, and production blocks as a production block library block tally 1122, a total time of the productions, production segments, and production blocks included in their library as a production block library time tally 1124, and any other suitable element summary. The user production library summary window 1120 can optionally include a select all feature 1121, offering the user an ability to select all listed or viewed productions, production segments, and production blocks from within their library. The user production library selection interface 1100 presents a listing of the productions, production segments, and production blocks included in the user's library. The illustrated user production library selection interface 1100 includes two exemplary listings: a first exemplary production summary window 1130 and a second exemplary production summary window 1140. Since the first exemplary production summary window 1130 and second exemplary production summary window 1140 share the same formatting, details of the second exemplary production summary window 1140 are described as an example of all listings. Each listing could include a select production block feature 1141 for selecting the specific listing; a production block view count indicator 1142, which indicates a number of times the listing is viewed, a production block time production block time 1144, which presents a total entertainment time of the specific listing; and a production block exemplary still image production block exemplary still image 1145, which displays a still image extracted from the production, production segment, or production block. The production block exemplary still image production block exemplary still image 1145 should be exemplary of the complete production, production segment, or production block.

The second exemplary production summary window 1140 further includes information that is associated with the specific production, production segment, or production block, such as production genre/category indices production genre/category indices 1146, person/character/actor/location/institution credited indices person/character/actor/location/institution credited indices 1147, trends or other tags listings trends or other tags listings 1148, and any other information that could be considered pertinent for a search.

Figure 5:
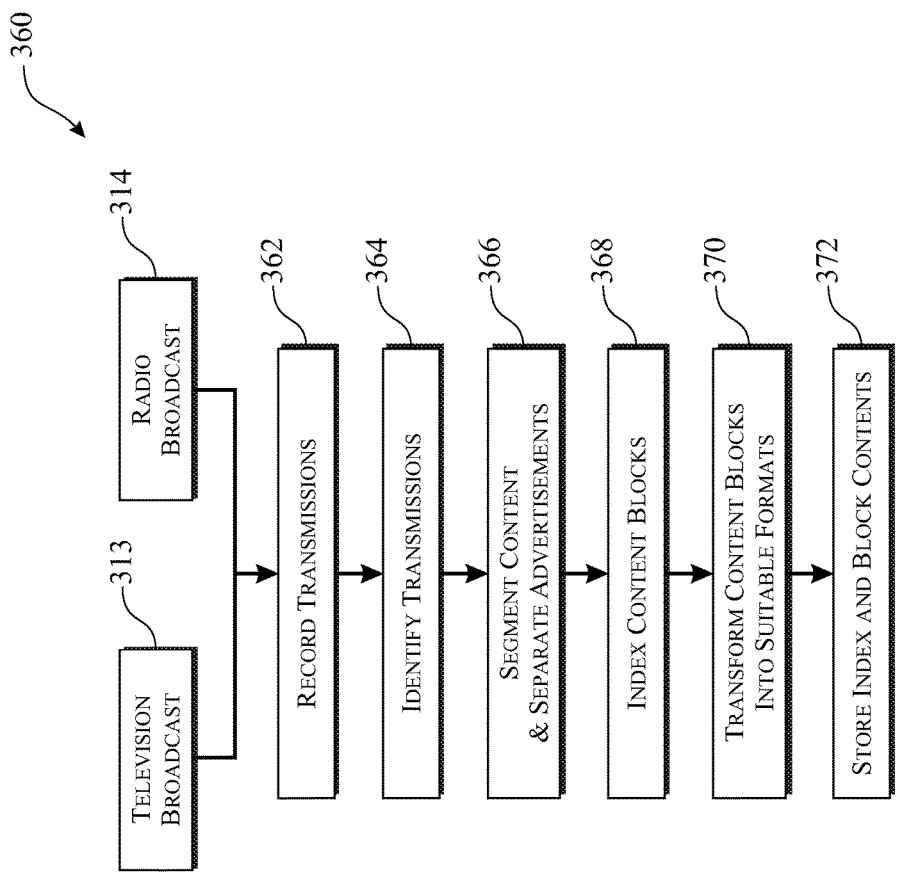
FIG. 5 presents a flow diagram representative of an exemplary broadcast processing overview.

In order to view one or more listings, the audience member can point to and select the desired listing. Upon selection, the listing would begin playing in a video production viewing window 1112. The video production viewing window 1112 can be provided on a computer monitor or forwarded to the Internet protocol television 152. In an audio production, the sound could be forwarded to a stereo or other audio output system. When the audience member prefers to view a plurality of listing, the audience member would select a series of listings using the associated select production block feature 1141. Once all of the desired listings are selected, the audience member would initiate the viewing process by either pointing to or selecting one of the selected listings. It is understood that the entertainment and advertisement distribution optimizing system 112 would process the selection as described in FIGS. 5 and 13 to create a complete production 312 comprising the selected at least one production segment and one or more advertising segments having advertising criteria 390 considered to optimize placement with segment criteria 380 associated with the selected listing and the audience members profile or demographics.

The user production library selection interface 1100 can offer several optional functions to the audience member. One such function is a play selected production blocks feature 1150, which enables the user to copy or forward a selected listing to another party. Since it is likely that the audience member library includes a number of listings, the user production library selection interface 1100 would preferably include a link to search production blocks with in user library feature link to search production blocks with in user library feature 1152, which enables the user to search their library for specific listings. Another optional feature is a list videos/audio/both selector list videos/audio/both selector 1154, which enables the user to segment the search or listings into a list containing either video only, audio only, or both video. Another optional feature would be a library viewing list filter (viewed, not viewed both toggle) feature 1156, which changes the selection feature to include all selected listings or exclude all selected listings. The same include or exclude in searches feature include or exclude in searches feature 1156 can be applied to searches.

Figure 14:
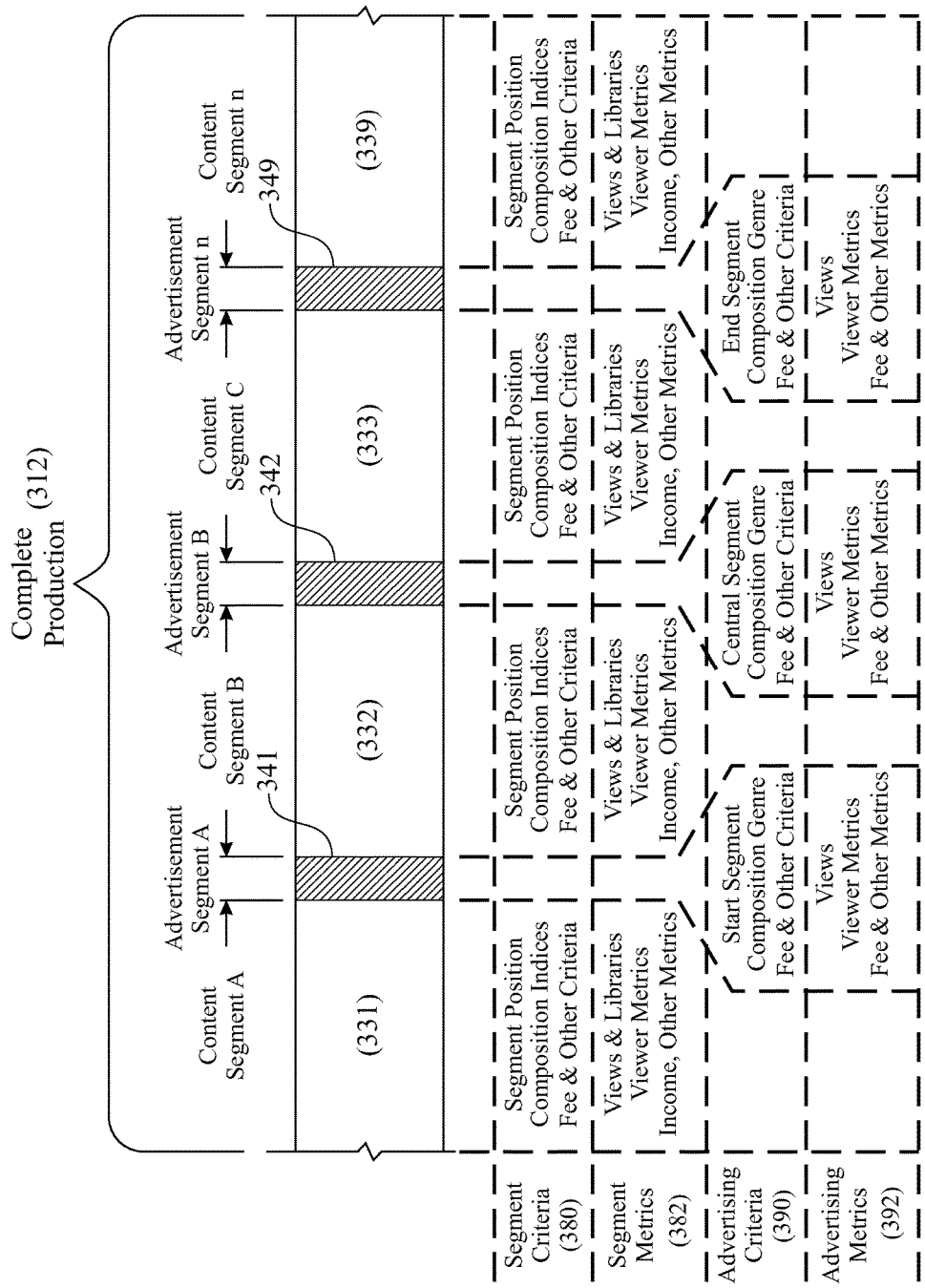
FIG. 14 presents a schematic mapping configuration demonstrating an exemplary production segmenting, categorizing, and sequencing process.

Exemplary criteria and metrics are illustrated in the exemplary mapping diagram presented in FIG. 14. Each production segment and production block would be associated with segment criteria 380 and segment metrics 382. The segment criteria 380 could include a segment position, content indices, fees associated with placement of advertisements, and other criteria. Segment metrics 382 could include views and viewing metrics, listings in user libraries, viewer metrics, income from views, and other metrics.

Similarly, each advertising campaign and each advertising segment would be associated with advertising criteria 390 and advertising metrics 392. Advertising criteria 390 can include which segment the advertisement should be associated with, which types of content genre or categories the advertisement should be associated with, which viewer demographics the advertisement should be associated with, maximum placement fees the advertising agent is willing to pay for placement, and other advertising placement criteria. Advertising metrics 392 can include number of views, viewer demographics, time and date of views, association with content or production segments, fees paid, placement location in sequence of production segments, and the like.

Figure 15:
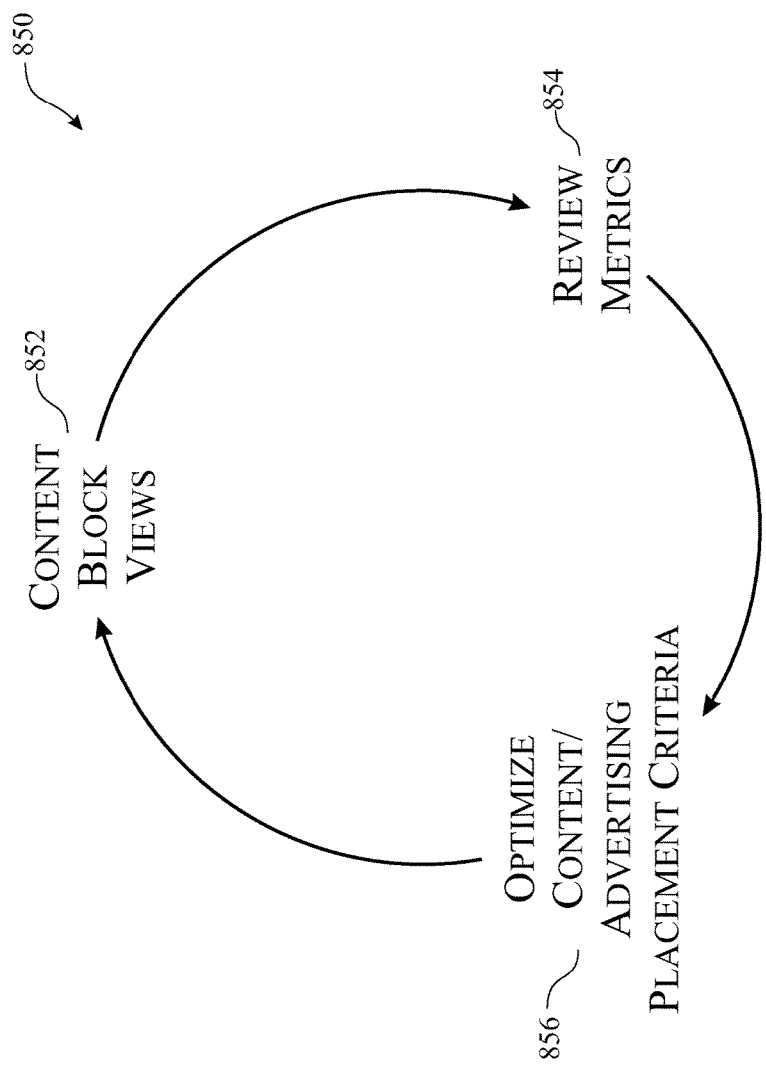
FIG. 15 presents a schematically arranged flow diagram of an exemplary advertising segment optimization cycle.
Figure 16:
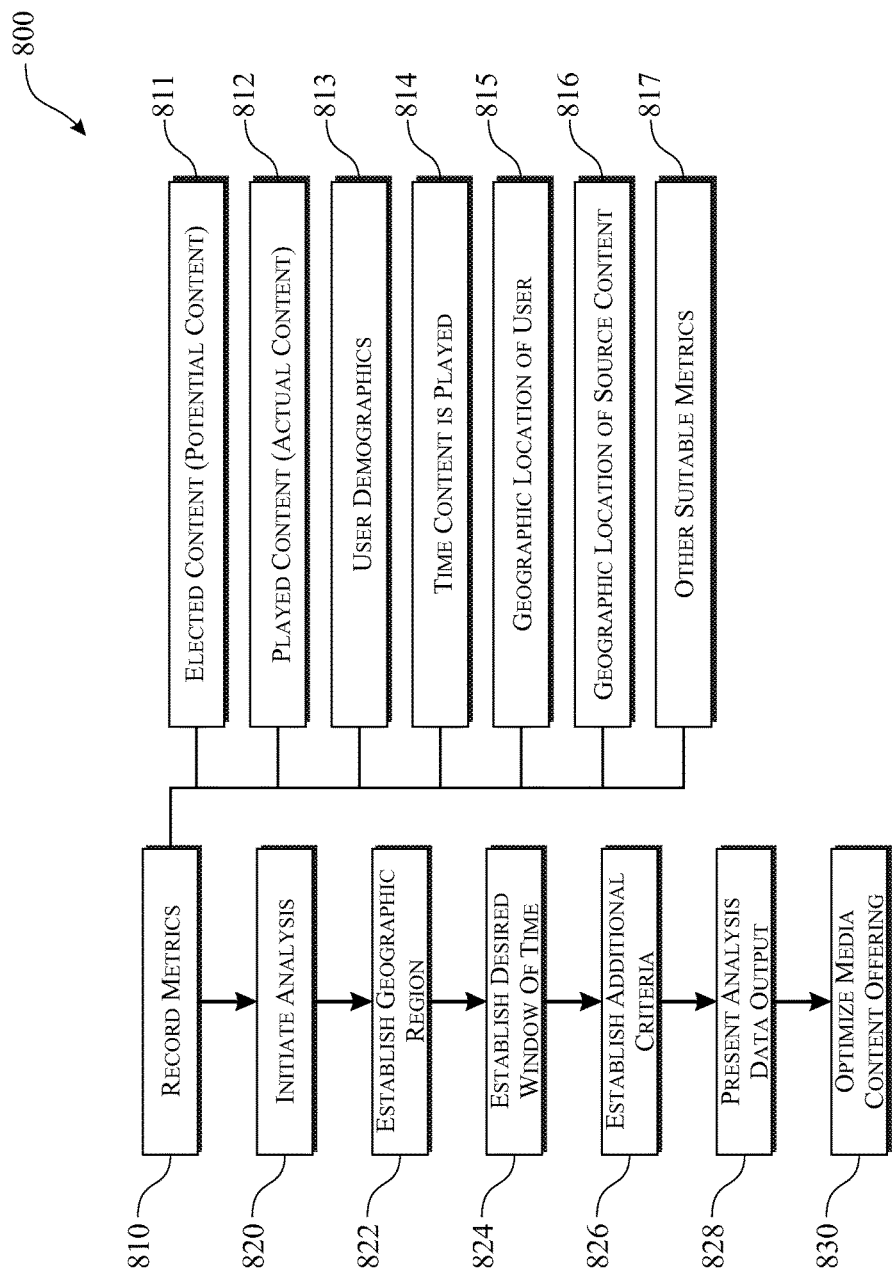
FIG. 16 presents a schematically arranged flow diagram of an exemplary metrics management and analysis process.

Optimization of placement of the advertising segments is based upon an advertising segment optimization cycle 850, as illustrated in FIG. 15. The exemplary advertising segment optimization cycle 850 presents a high level cycle for optimizing placement of advertisements into entertainment sequences. The advertising segment optimization cycle 850 defines a cycle of: obtaining metrics from content block views 852, analyzing and reviewing the metrics 854 and using the information from the metrics to optimize the placement criteria for placement of the advertisements 856.

The advertising segment optimization cycle 850 is presented in more detail in an exemplary metrics processing flow diagram 800. The exemplary metrics processing flow diagram 800 requires collection of metrics (step 810). The recorded metrics can include elected content 811, played content 812, audience member demographics 813, an amount of time of play per production segment 814, audience member geographic location 815, production source geographic location 816, and other suitable metrics 817. The metrics are collected over time as the audience enjoys the benefits provided by the system service provider 110. Acquisition of the data provides the basis for an analysis. The analysis is initiated (step 820) by defining certain limitations, such as one or more geographic locations 822, a desired window of time for the analysis 824, and introduction of any additional criteria 826. Once the analysis is presented the advertising management user, the analysis output can be utilized to optimize the placement criteria for each advertisement campaign, advertisement, or advertisement segment (step 830).

Figure 20:
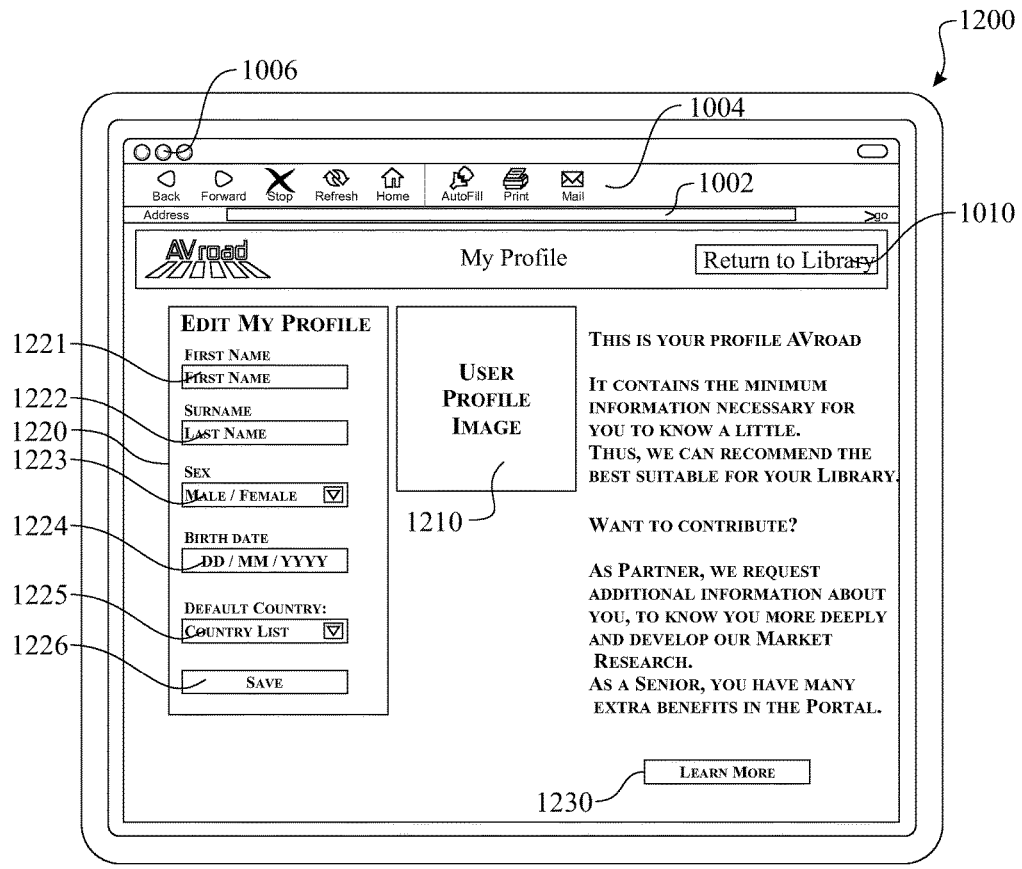
FIG. 20 presents a screen view of an exemplary audience user profile interface window of the entertainment and advertisement distribution optimizing system.
Figure 21:
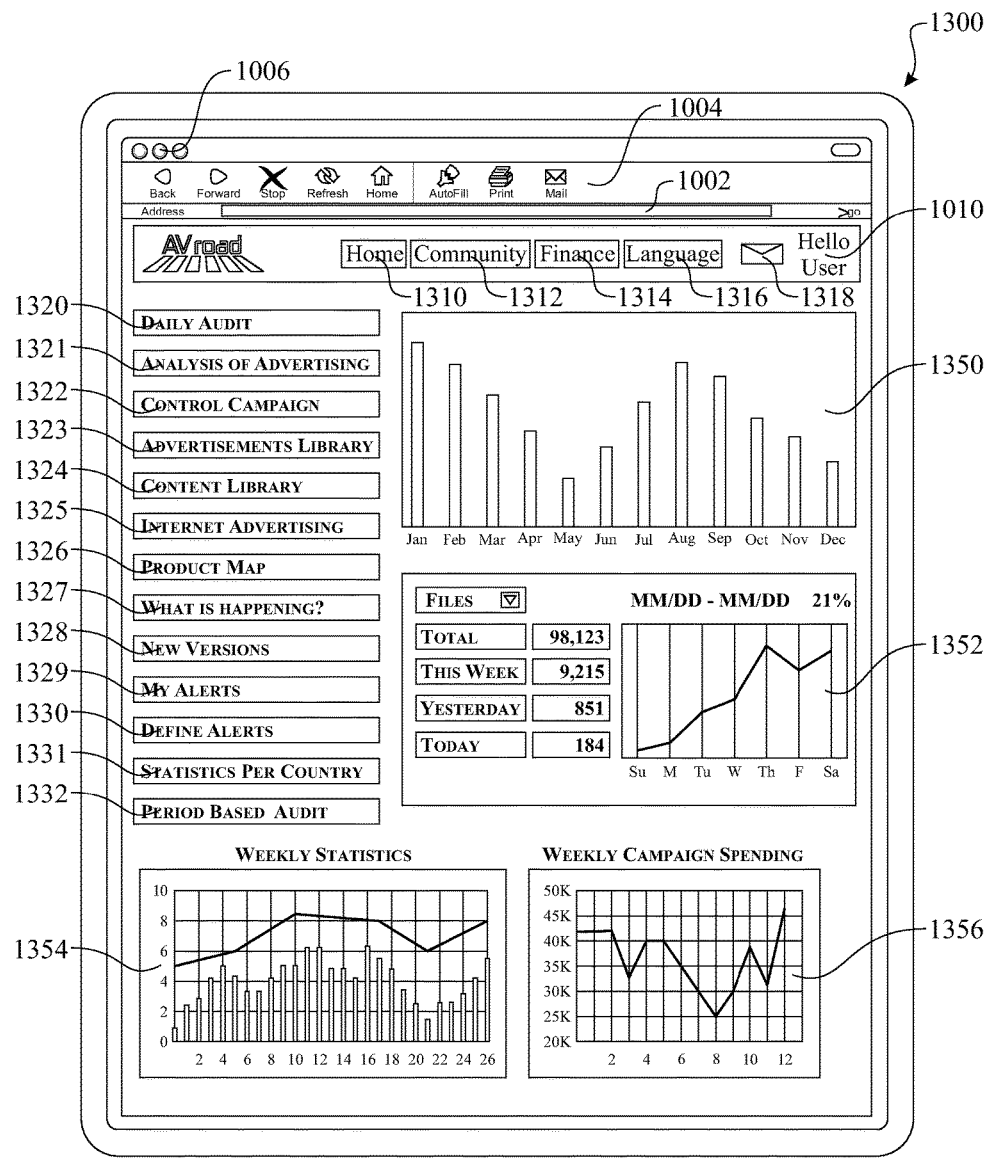
FIG. 21 presents a screen view of first portion of an exemplary metrics management, analysis, and output interface window of the entertainment and advertisement distribution optimizing system.

The recorded metrics offers both advertisers and broadcasters significant feedback on audience demographics, viewing characteristics of production segments, and effectiveness of advertising placements. An exemplary metrics management and output interface 1300, as illustrated in FIGS. 20 and 21, is directed towards an advertising manager, but it is understood that the exemplary metrics management and output interface 1300 can be adapted for use by a production manager.

The exemplary metrics management and output interface 1300 includes commonly provided internet browser features, as previously described, and introduces a home page link 1310, a community page link 1312, a finance interface page link 1314, a language selection pull down 1316, and an email/contact us feature 1318. The home page link 1310 returns the user to a home page of the portal. The community page link 1312 transfers the user to a community portal page for searching and viewing productions, production segments, and production blocks. The finance interface page link 1314 transfers the user to a financial management page. The language selection pull down 1316 enables the user to select a desired compatible language for the portal. This would translate all of the indices into the selected language. The email/contact us feature 1318 provides any of a variety of methods for the user to contact the system service provider 110. The email/contact us feature 1318 can additionally be utilized to send emails to another individual. It is understood that any of the exemplary features can be included on any of the other graphical user interface functions.

The metrics management and output interface 1300 would include a series of options for searching, obtaining, tallying, and presenting the analysis. The metrics management and output interface 1300 presents a series of exemplary options including:

- a daily audit function 1320, which provides an analysis of the user's advertising campaign over each day;
- an advertising analysis feature 1321, which provides the user with an analysis of the advertising campaign, wherein the user can enter any criteria to optimize the analysis and output formats;
- a campaign control feature 1322, which forwards the user to a campaign management tool to create, modify, or delete placement from the advertising placement criteria 390;
- an ads library 1323, which provides the portal, the advertising agent, and others with access to advertisements as well as an ability to provide trends or other data associated with user libraries;
- a library content access feature 1324, which provides the advertising agent with information associated with placement and profiles of user's libraries;
- a Internet advertising feature 1325, which enables placement of Internet based advertisements into one or more of the graphical user interface windows, into the productions, and the like, and/or criteria for placement of advertising segments provided to the system service provider 110 onto other Internet websites;
- a product map feature 1326;
- a what is happening feature 1327, which presents trends and other key information to the advertising manager;
- a new versions feature 1328;
- a user alerts feature 1329, which provides feedback to the advertising manager based upon predetermined alert criteria established by the advertising manager, the system, and the like;
- a defining user alert feature 1330, which provides the advertising manager with an ability to establish alert criteria for the user alerts feature 1329;
- a statistics per region/country feature 1331, which enables the advertising manager with an ability to distinguish data between geographic regions, territories, countries, continents, languages, and the like; and
- a period based audit feature 1332, which generates an analysis using data that is associated with a time period defined by the advertising manager.

The resulting analysis data can be presented in any of a variety of formats. The illustrated metrics management and output interface 1300 presents several exemplary data output formats. It is understood that the metrics presentation formats can be modified to be presented in any suitable and user-friendly format. An exemplary monthly production block placement statistics bar chart 1350 presents analysis output by month in a bar chart format. It is understood that the data can be represented in any suitable format, including a line chart, a pie chart, and the like. A campaign metrics summary 1352 presents details pertaining to the placements, views, and other activities associated with the subject advertising campaign. The illustrated example presents the data in both graphical and numerical formats. The data would be determined based upon an entered window of time, indicated by the MM/DD-MM/DD header of the campaign metrics summary 1352. The campaign metrics summary 1352 can optionally include a pull down menu enabling the advertising manager with an ability to transition between individual campaigns, select a plurality of campaigns, or all campaigns. A weekly statistics graphical output 1354 provides a graphical presentation of statics or metrics associated with one or more advertising campaigns over a period of time, wherein the data is tallied on a weekly basis. Similarly, a weekly campaign spending data presentation 1356 presents a financial summary of the one or more advertising campaigns over the same period of time, wherein again, the data is tallied on a weekly basis.

Figure 22:
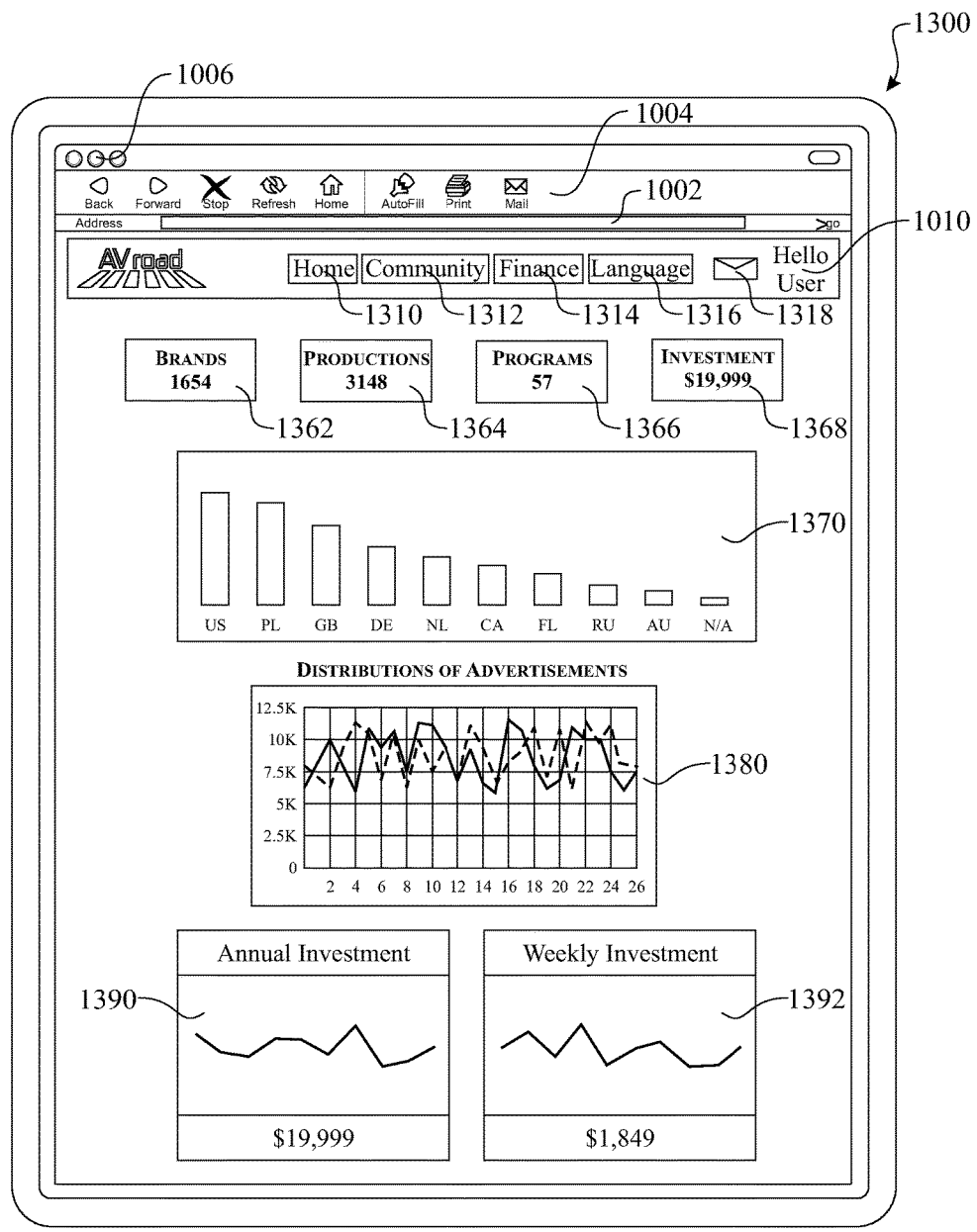
FIG. 22 presents a screen view of second portion of the exemplary metrics management, analysis, and output interface window originally introduced in FIG. 20.

Additional information is presented in a portion of the metrics management and output interface 1300 illustrated in FIG. 22. The metrics management and output interface 1300 can include a general report of all products being advertised. This can be ether all products advertised by the system service provider 110, all products advertised by the advertising manager, or any other grouping that would be established by the user analyzing the metrics. The examples presented include a total campaigning brands 1362, a total productions available 1364, a total campaign programs 1366, and a total investment in the campaign 1368. It is understood that these are only exemplary and that any metric can be displayed in this manner.

The information can be sorted and presented in other formats, such as a campaign views by region/country 1370, which is presenting a number of views of the advertising campaign in each of the various countries. In an alternative presentation, the distribution of advertisements by week 1380 can be presented in a form of a line chart, wherein each line style would represent a placement based upon different placement criteria 390 to help optimize the placement criteria 390.

Financial summaries can be presented in any suitable, preferably user based, format. Two examples are included in the illustration: an average annual investment 1390 and an average weekly investment 1392.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out the proposed invention, but that the invention will include all the embodiments falling within the scope of the appended claims.

ELEMENT DESCRIPTION REFERENCES

Ref. No. Description
100 entertainment and advertisement distribution optimizing network
110 system service provider
112 entertainment and advertisement distribution optimizing system
114 entertainment and advertisement system database storage array
120 Internet
121 entertainment and advertisement system Internet communication link
130 local airway broadcast television and radio source
131 local airway broadcast television and radio source communication link
132 satellite television and radio source 133 satellite television and radio source communication link
134 cable broadcast television and radio source
135 cable television and radio source communication link
138 exemplary television and radio sources
139 exemplary regional television and radio source communication links
140 first exemplary audience member
141 first exemplary audience member communication link
142 second exemplary audience member
143 second exemplary audience member communication link
144 nth exemplary audience member
145 nth exemplary audience member
148 exemplary regional audience members
149 exemplary audience member communication links
150 user Internet protocol computing device
152 Internet protocol television
200 entertainment and advertisement control system
202 regional based production node
204 central production node
210 regional based production system
212 regional based production server
214 regional based production database
222 collection of advertisements
224 data blocks
226 entertainment production files
230 content portal
232 central database
234 pre-selection of users
236 listings engine
238 listing of users
239 content portal interface
240 community portal
242 universe
244 audience member IP interfacing computing device
246 audience member metrics report
250 system usage data
300 audio/video management system
310 production capture subsystem
312 production files
313 television productions
314 radio productions
316 capture process
318 metrics calculations
319 production reorganizer
320 capture and segmenting subsystem
323 capture entertainment contents
324 capture advertising files
330 segment and classify entertainment productions
331 opening production segment
332 second production segment
332 third production segment
334 fourth production segment
335 fifth production segment
339 nth production segment
340 segment and classify advertising spots
341 opening advertising segment
342 second advertising segment
343 third advertising segment
344 fourth advertising segment
349 nth advertising segment
350 entertainment and advertising database
352 local database
360 broadcast processing overview flow diagram
362 record production transmissions step
364 identify production broadcast transmissions step
366 segment content and separate advertisements into content blocks step
368 index content blocks step
370 transform content blocks in to suitable formats step
372 store index and block contents step
380 segment criteria
382 segment metrics
390 advertising criteria
392 advertising metrics
400 exemplary block header index category listing
410 block header index
412 content title
414 genre
416 content classification
418 description and/or summary
420 subject matter
422 cast members
424 production credits
426 release dates
428 chronology
440 exemplary content segment index category listing
450 content segment index
452 block header index information
454 start time of the segment/block
456 duration of the segment/block
458 cast members acting in the content segment/block
460 characters presented in the content segment/block
462 entities/institutions presented in the content segment/block
464 summary of topics in the content segment/block
466 highlights and/or interests shown in the content segment/block
468 other pertinent information associated with the content segment/block
500 production presentation process flow diagram
510 portal access step
520 audience user demographics acquisition step
521 user's name
522 user's email address
523 user's sex
524 user's date of birth and/or age
525 user's residence and/or current location
526 user's level of education/training
527 user's socioeconomic status
528 user's income level
529 user's profession
530 user's demographics entry procedure
532 user's demographics direct entry procedure
534 member demographics log-in based acquisition procedure
540 desired content search step
542 audience selection of returned content search results step
544 audience member create and/or edit user playlist step
546 audience member scheduling playlist step
548 play/view/listen to selected content from playlist step
550 record production segment and associated demographics step
552 update metrics step
600 initial system access flow diagram
610 portal home page
620 audience member access
622 establish audience member demographics
624 establish automated search criteria
626 establish manual search criteria
630 paid participant access
632 advertisers and advertising agencies 634 advertising based viewer metrics
636 optimize criteria for target audience viewing
642 broadcaster participant access
644 production based viewer metrics
645 content based viewer metrics
646 optimize production criteria for viewing placement
648 optimize content placement & topics criteria
700 exemplary user library utilization process flow diagram
702 start step
704 end step
710 enter search criteria step
712 determine, return and display matching production segments step
714 select desired production segments from displayed matching production segments step
716 save selected production segments in user library step
718 search library to select blocks for viewing step
720 select blocks from library for viewing step
730 initiate viewing of selected blocks step
732 user controlled viewing time option
734 system controlled viewing time option
736 conclude viewing of selected blocks step
740 record block viewing data and user metrics on server step
750 manually delete production blocks from user library step
752 automatically delete production blocks from user library step
800 exemplary metrics processing flow diagram
810 record identified metrics step
811 elected content
812 played content
813 audience member demographics
814 time of play per segment
815 audience member geographic location
816 production source geographic location
817 other suitable metrics
820 initiate metrics analysis step
822 establish geographic region step
824 establish window of time for analysis
826 establish other analysis criteria
828 present analysis data step
830 optimize media content offering step
850 advertising segment optimization cycle
852 content block views
854 review metrics
856 optimize segment/advertising placement criteria
900 exemplary search process flow diagram
910 enter search criteria step
912 manual or automated search decision step
920 manually search contents step
921 archive search history step
922 determine, return and display matching production segments step
924 select desired production segments from displayed matching production segments step
926 store selected productions in user library
928 view productions or production segments step
930 record viewing metrics step
940 automatically cyclically search production contents step
942 automatically returning and listing search results step
944 automatically stores search results in user library step
946 user manually revises updated user library step
1000 exemplary search interface
1002 address bar
1004 interface page tool bar
1006 window size and location control icons
1010 return to library link
1012 help link
1020 dates calendar link
1022 today's date quick entry
1024 yesterdays date quick entry
1026 all dates quick entry
1028 range date entry request icon
1030 range of hours
1032 start hour selector
1034 end hour selector
1040 hour selector slide bar
1042 hour selector start slide icon
1044 hour selector end slide icon
1050 genre/categories selector
1052 person/character/actor appearance data entry feature
1054 person/character/actor/location/institution credited data entry feature
1056 trends or other tags data entry feature
1058 specific programs of interest data entry feature
1060 search submission icon
1100 user production library selection interface
1110 user identification
1112 video production viewing window
1120 user production library summary window
1121 select all feature
1122 production block library block tally
1124 production block library time tally
1130 first exemplary production summary window
1140 second exemplary production summary window
1141 select production block feature
1142 production block view count indicator
1144 production block time
1145 production block exemplary still image
1146 production genre/category indices
1147 person/character/actor/location/institution credited indices
1148 trends or other tags listings
1150 replicate/forward selected production blocks feature
1152 link to search production blocks with in user library feature
1154 list videos/audio/both selector
1156 include or exclude in searches feature
1200 audience user profile interface
1210 audience user profile photo
1220 audience user profile edit window
1221 audience user first name edit window
1222 audience user surname/last name edit window
1223 audience user sex selector
1224 audience user birth date entry feature
1225 audience member default residing country selector
1226 save profile icon
1230 learn more feature link
1300 metrics management and output interface
1310 home page link
1312 community page link
1314 finance interface page link
1316 language selection pull down
1318 email/contact us feature
1320 daily audit function
1321 advertising analysis feature
1322 campaign control feature
1323 library notices feature
1324 library content access feature
1325 Internet advertising feature
1326 product map feature
1327 what is happening feature
1328 high versions feature 1329 user alerts feature
1330 defining user alert feature
1331 statistics per region/country feature
1332 period based audit feature
1350 exemplary monthly production block placement statistics bar chart
1352 campaign metrics summary
1354 weekly statistics graphical output
1356 weekly campaign spending data presentation
1362 total campaigning brands
1364 total productions available
1366 total campaign programs
1368 total investment in the campaign
1370 campaign views by region/country
1380 distribution of advertisements by week
1390 average annual investment
1392 average weekly investment
1412 content block 1
1414 unused segment
1416 content block 2
1418 content block 3
1420 unused segment
1424 content block 4 (1/3)
1432 content block 4 (2/3)
1434 content block 4 (3/3)
1462 advertisement segment 1
1464 advertisement segment 2
1466 advertisement segment 3
1468 advertisement segment n

What is claimed is:

1. A method for collecting and distributing audiovisual content blocks and creation of audience statistics, the method comprising steps of:
　establishing viewer demographics of a viewer;
　recording said viewer demographics;
　capturing broadcast production content;
　segmenting said captured production content into production blocks, each production block being a suitable length;
　storing said production blocks in a production block library;
　determining identifiable aspects of each production block in accordance with search criteria categories;
　indexing said identifiable aspects of each production block enabling searching capabilities and identification of desired production blocks into a block header index;
　submitting search criteria for searching said production block library;
　searching said production block library for production blocks to identify production blocks matching said submitted search criteria;
　selecting production blocks from production blocks matching said submitted search criteria;
　combining said selected production blocks into at least one production segment;
　viewing streamed content containing said production segment;
　storing a history of viewed streamed content containing said production segment and associated user demographics;
　recording metrics which associate said viewer demographics, submitted search criteria, said selected production blocks, and said viewing history with one another; and
　analyzing said recorded metrics.

2. A method for collecting and distributing audiovisual content blocks and creation of audience statistics as recited in claim 1, the method further comprising a step of:
　establishing said search criteria categories including at least one of:
　composition title of said captured production content,
　genre of said captured production content,
　classification of said captured production content,
　description of said captured production content,
　subject matter of said captured production content,
　cast members of said captured production content,
　production credits of said captured production content,
　release dates of said captured production content, and
　chronology of said captured production content.

3. A method for collecting and distributing audiovisual content blocks and creation of audience statistics as recited in claim 1, the method further comprising a step of:
　establishing information associated with said block header index to include at least one of:
　start time block of each of said desired production blocks,
　duration time span of each of said desired production blocks,
　cast members acting in each of said desired production blocks,
　characters presented in each of said desired production blocks,
　entities shown in each of said desired production blocks,
　institutions shown in each of said desired production blocks,
　summary of topics associated with each of said desired production blocks,
　highlights associated with each of said desired production blocks, and
　interests associated with each of said desired production blocks.

4. A method for collecting and distributing audiovisual content blocks and creation of audience statistics as recited in claim 1, the method further comprising a step of:
　establishing advertisement placement criteria based upon at least one of:
　said viewer demographics,
　said submitted search criteria,
　said selected production blocks, and
　said viewing history user demographics.

5. A method for collecting and distributing audiovisual content blocks and creation of audience statistics as recited in claim 1, the method further comprising a step of:
　establishing information associated with said viewer demographics to include at least one of:
　viewer's first name,
　viewer's last name,
　viewer's sex,
　viewer's date of birth,
　viewer's age,
　viewer's location,
　viewer's level of education,
　viewer's socioeconomic status,
　viewer's income level, and
　viewer's profession.

6. A method for collecting and distributing audiovisual content blocks and creation of audience statistics as recited in claim 1, the method further comprising a step of:
　wherein advertisement placement criteria is determined by at least one of an advertising party and a broadcasting party.

7. A method for collecting and distributing audiovisual content blocks and creation of audience statistics as recited in claim 1, the method further comprising a step of:
 establishing automated search criteria, wherein said automated search criteria is associated with said viewer.

8. A method for collecting and distributing audiovisual content blocks and creation of audience statistics as recited in claim 7, the method further comprising steps of:
 determining a listing of at least one of said captured production content and said production blocks to said viewer based upon said automated search criteria associated with said viewer; and
 presenting said listing of at least one of said captured production content and said production blocks to said viewer.

9. A method for collecting and distributing audiovisual content blocks and creation of audience statistics as recited in claim 1, the method further comprising a step of:
 maintaining a listing of at least one of previously viewed said captured production content and previously viewed said production blocks, wherein said listing of at least one of previously viewed said captured production content and previously viewed said production blocks is stored in a viewer library.

10. A method for collecting and distributing audiovisual content blocks and creation of audience statistics as recited in claim 9, the method further comprising a step of:
 automatically removing one of said at least one of previously viewed said captured production content and previously viewed said production blocks from said viewer library based upon predetermined criteria.

11. A method for collecting and distributing audiovisual content blocks and creation of audience statistics comprising steps of:
 establishing viewer demographics of a viewer;
 recording said viewer demographics;
 capturing broadcast production content;
 segmenting said captured production content into production blocks, each production block being a suitable length;
 storing said production blocks in a production block library;
 transforming said production blocks into a suitable format;
 determining identifiable aspects of each production block in accordance with search criteria categories;
 indexing said identifiable aspects of each production block enabling searching capabilities and identification of desired production blocks into a block header index;
 submitting search criteria for searching said production block library;
 searching said production block library for production blocks to identify production blocks matching said submitted search criteria;
 selecting production blocks from production blocks matching said submitted search criteria;
 combining said selected production blocks into at least one production segment;
 viewing said streamed content containing said production segment;
 storing a history of viewed streamed content containing said production segment and associated user demographics;
 recording metrics which associate said viewer demographics, submitted search criteria, said selected production blocks, and said viewing history with one another; and
 analyzing said recorded metrics.

12. A method for collecting and distributing audiovisual content blocks and creation of audience statistics as recited in claim 11, the method further comprising a step of:
 establishing said search criteria categories including at least one of:
 composition title of said captured production content,
 genre of said captured production content,
 classification of said captured production content,
 description of said captured production content,
 subject matter of said captured production content,
 cast members of said captured production content,
 production credits of said captured production content,
 release dates of said captured production content, and
 chronology of said captured production content.

13. A method for collecting and distributing audiovisual content blocks and creation of audience statistics as recited in claim 11, the method further comprising a step of:
 establishing information associated with said block header index to include at least one of:
 start time block of each of said desired production blocks,
 duration time span of each of said desired production blocks,
 cast members acting in each of said desired production blocks,
 characters presented in each of said desired production blocks,
 entities shown in each of said desired production blocks,
 institutions shown in each of said desired production blocks,
 summary of topics associated with each of said desired production blocks,
 highlights associated with each of said desired production blocks, and
 interests associated with each of said desired production blocks.

14. A method for collecting and distributing audiovisual content blocks and creation of audience statistics as recited in claim 11, the method further comprising a step of:
 establishing advertisement placement criteria based upon at least one of:
 said viewer demographics,
 said submitted search criteria,
 said selected production blocks, and
 said viewing history user demographics.

15. A method for collecting and distributing audiovisual content blocks and creation of audience statistics as recited in claim 11, the method further comprising a step of:
 establishing information associated with said viewer demographics to include at least one of:
 viewer's first name,
 viewer's last name,
 viewer's sex,
 viewer's date of birth,
 viewer's age,
 viewer's location,
 viewer's level of education,
 viewer's socioeconomic status,
 viewer's income level, and
 viewer's profession.

16. A method for collecting and distributing audiovisual content blocks and creation of audience statistics as recited in claim 11, the method further comprising a step of:
 wherein said advertisement placement criteria is determined by at least one of an advertising party and a broadcasting party.

17. A method for collecting and distributing audiovisual content blocks and creation of audience statistics as recited in claim 11, the method further comprising a step of:
    establishing automated search criteria, wherein said automated search criteria is associated with said viewer.

18. A method for collecting and distributing audiovisual content blocks and creation of audience statistics as recited in claim 17, the method further comprising steps of:
    determining a listing of at least one of said captured production content and said production blocks to said viewer based upon said automated search criteria associated with said viewer; and
    presenting said listing of at least one of said captured production content and said production blocks to said viewer.

19. A method for collecting and distributing audiovisual content blocks and creation of audience statistics as recited in claim 11, the method further comprising a step of:
    maintaining a listing of at least one of previously viewed said captured production content and previously viewed said production blocks, wherein said listing of at least one of previously viewed said captured production content and previously viewed said production blocks is stored in a viewer library.

20. A method for collecting and distributing audiovisual content blocks and creation of audience statistics as recited in claim 19, the method further comprising a step of:
    automatically removing one of said at least one of previously viewed said captured production content and previously viewed said production blocks from said viewer library based upon predetermined criteria.

\* \* \* \* \*